US012734793B2

(12) United States Patent
Thorburn et al.

(10) Patent No.: US 12,734,793 B2
(45) Date of Patent: Sep. 15, 2026

(54) POLYMERIC FILM AND USES THEREOF

(71) Applicant: Mylar Specialty Films U.S. Limited Partnership, Chester, VA (US)

(72) Inventors: Katrina Thorburn, Redcar (GB); Dmytro Stratiychuk-Dear, Redcar (GB); Karl Rakos, Redcar (GB)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 894 days.

(21) Appl. No.: 17/298,199

(22) PCT Filed: Dec. 6, 2019

(86) PCT No.: PCT/GB2019/053454

§ 371 (c)(1),
(2) Date: May 28, 2021

(87) PCT Pub. No.: WO2020/115498

PCT Pub. Date: Jun. 11, 2020

(65) Prior Publication Data

US 2022/0111624 A1 Apr. 14, 2022

(30) Foreign Application Priority Data

Dec. 6, 2018 (GB) ..................................... 1819929

(51) Int. Cl.
*B32B 27/36* (2006.01)
*B29B 7/90* (2006.01)
(Continued)

(52) U.S. Cl.
CPC ................ *B32B 27/36* (2013.01); *B29B 7/90* (2013.01); *B29C 48/0018* (2019.02); (Continued)

(58) Field of Classification Search
CPC ......... B32B 27/36; B32B 27/08; B32B 27/20; B32B 2250/244; B32B 2264/1021; (Continued)

(56) References Cited

U.S. PATENT DOCUMENTS 4,770,931 A * 9/1988 Pollock ...................... C08J 5/18 215/400
2001/0010859 A1 8/2001 Rakos et al.
(Continued)

FOREIGN PATENT DOCUMENTS

EP 0667541 A2 8/1995
EP 1900515 A1 * 3/2008 ............ B32B 27/20
(Continued)

OTHER PUBLICATIONS

Translation to English for WO2018198720 A1 via espacenet. accessed Feb. 2, 2024 (Year: 2018).*
(Continued)

*Primary Examiner* — Maria V Ewald
*Assistant Examiner* — Ethan Weydemeyer
(74) *Attorney, Agent, or Firm* — Wolf, Greenfield & Sacks, P.C.

(57) ABSTRACT

A matt polymeric film, which may be a single layer or multi-layer film, comprising particles having a volume-weighted mean size (D(4,3)) of no more than 25 μm. The particles may be present in an amount of from about 5% to about 35% by volume fraction of the film. The matt film is suitable for use as a printable film and/or as a release film in cast release applications.

27 Claims, 15 Drawing Sheets

(51) Int. Cl.

| | |
|---|---|
| ***B29C 48/00*** | (2019.01) |
| ***B29C 48/08*** | (2019.01) |
| ***B32B 27/08*** | (2006.01) |
| ***B32B 27/20*** | (2006.01) |
| *B29K 67/00* | (2006.01) |
| *B29K 105/16* | (2006.01) |
| *B29L 7/00* | (2006.01) |

(52) U.S. Cl.

CPC .............. *B29C 48/08* (2019.02); *B32B 27/08* (2013.01); *B32B 27/20* (2013.01); *B29K 2067/00* (2013.01); *B29K 2105/16* (2013.01); *B29L 2007/008* (2013.01); *B32B 2250/244* (2013.01); *B32B 2264/1021* (2020.08); *B32B 2307/408* (2013.01); *B32B 2307/518* (2013.01); *B32B 2307/538* (2013.01); *B32B 2307/732* (2013.01); *B32B 2307/75* (2013.01)

(58) Field of Classification Search

CPC ........ B32B 2307/408; B32B 2307/518; B32B 2307/538; B32B 2307/732; B32B 2307/75; B32B 27/285; B32B 27/32; B32B 27/34; B32B 2307/4023; B29B 7/90; B29C 48/0018; B29C 48/08; B29K 2067/00; B29K 2105/16; B29L 2007/008; B41M 5/50; B41M 5/502; B41M 5/5218; B41M 5/5127

See application file for complete search history.

(56) References Cited

U.S. PATENT DOCUMENTS

| | | | | |
|---|---|---|---|---|
| 2004/0157069 | A1 | 8/2004 | Klein et al. | |
| 2004/0178139 | A1* | 9/2004 | Suh | B29C 55/023 210/488 |
| 2006/0134382 | A1 | 6/2006 | Jesberger et al. | |
| 2008/0122135 | A1 | 5/2008 | Oku et al. | |
| 2009/0246483 | A1 | 10/2009 | Sugimura | |
| 2010/0080940 | A1* | 4/2010 | Godey | B29C 48/08 428/220 |
| 2010/0166997 | A1* | 7/2010 | Chisaka | B32B 3/30 156/60 |
| 2017/0218153 | A1* | 8/2017 | Fitch | C08J 7/0427 |
| 2018/0126765 | A1 | 5/2018 | Zhou et al. | |
| 2019/0085506 | A1* | 3/2019 | Higashikawa | B32B 13/12 |
| 2021/0108055 | A1 | 4/2021 | Iida et al. | |
| 2021/0197539 | A1* | 7/2021 | Weis | B32B 3/26 |
| 2021/0206188 | A1* | 7/2021 | Shimanaka | B41N 1/04 |

FOREIGN PATENT DOCUMENTS

| | | | | |
|---|---|---|---|---|
| EP | 3 786 220 | A1 | | 3/2021 |
| JP | 2005-263931 | A | | 9/2005 |
| JP | 2010-005829 | | | 1/2010 |
| JP | 2010-284804 | | | 12/2010 |
| JP | 2013129075 | A | * | 7/2013 |
| JP | 2013193363 | A | * | 9/2013 |
| WO | WO 2017/138638 | A1 | | 8/2017 |
| WO | WO 2018/198720 | A1 | | 11/2018 |
| WO | WO 2019/073737 | A1 | | 4/2019 |

OTHER PUBLICATIONS

Translation to English for DE1900515 A1 via espacenet. accessed Apr. 30, 2024 (Year: 2008).*

Translation to English for JP2013-129075 A via espacenet. accessed Apr. 30, 2024 (Year: 2013).*

Translation to English for JP2013-193363 A via espacenet. accessed Apr. 30, 2024 (Year: 2013).*

Search Report under Section 17(5) for GB Application No. 1819919.9 dated Jun. 10, 2019.

International Search Report and Written Opinion for International Application No. PCT/GB2019/053454 mailed May 6, 2020.

Written Opinion of the International Preliminary Examining Authority for International Application No. PCT/GB/2019/053454 mailed Nov. 18, 2020.

[No Author Listed], Sekisui Techpolymer MBX series. NICNAS. Mar. 2007;PLC/669:11 pages.

[No Author Listed], Talc Product Information. Matsamura Industrial. http://www.matsumurasangyo.co.jp/product/ [last accessed Oct. 15, 2020]. 6 pages.

[No Author Listed], Understanding and Interpreting Particle Size Distribution Calculations. HORIBA Scientific. http://www.horiba.com/scientific/products/particle-characterization/education/general-information/data-interpretation/understanding-particle-size-distribution-calculations/ [last accessed Sep. 26, 2019]. 7 pages.

Roberts, Gloss Measurement Conversion to Other Angles. Measure What You See. https://measurewhatyousee.com/2015/07/10/gloss-measurement-conversion-to-other-angles/ [last accessed Oct. 15, 2020]. 1 page.

GB 1819919.9, Jun. 10, 2019, Search Report under Section 17(5).

PCT/GB2019/053454, May 6, 2020, International Search Report and Written Opinion.

PCT/GB2019/053454, Nov. 18, 2020, Written Opinion of the International Preliminary Examining Authority.

* cited by examiner

FIG. 3(contd)
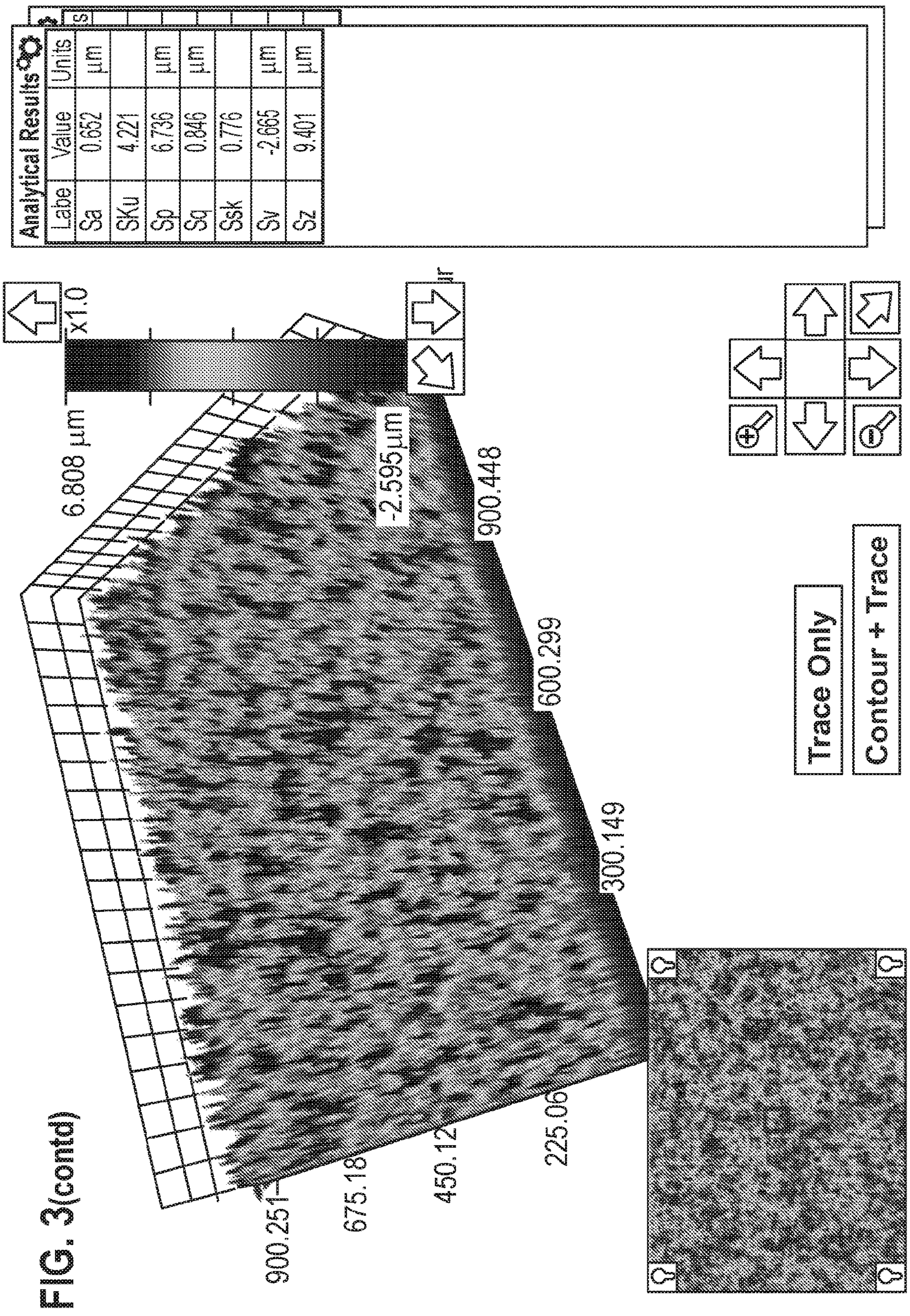
| Labe | Value | Units |
|---|---|---|
| Sa | 0.652 | µm |
| SKu | 4.221 | |
| Sp | 6.736 | µm |
| Sq | 0.846 | µm |
| Ssk | 0.776 | |
| Sv | -2.665 | µm |
| Sz | 9.401 | µm |

Analytical Results
Label | Value | Units
Mag. Slope Ra | 11.447 | deg
Mag. Slope Rp | 73.471 | deg
Mag. Slope Rq | 15.746 | deg
Mag. Slope Rt | 147.492 | deg
Mag. Slope Rv | -74.021 | deg
45
40
20
0
deg
-20
-40
-45
900
800
600
400
200
0
µm
0
200
400
600
800
1000
1200
µm Gurley Porosity (s)
450000
400000
350000
300000
250000
200000
150000
100000
50000
0
Ex. 4
Ex. 2
Ex. 3
Ex. 1
Stain Lenght (mm)
100
90
80
70
60
50
40
30
20
10
0
Ex. 4
Ex. 2
Ex. 3
Ex. 1
Ex. 4
Ex. 2
Ex. 3
Ex. 1

Analytical Results

| Labe | Value | Units |
|---|---|---|
| Sa | 1428.667 | nm |
| Sku | 7.693 | |
| Sp | 9577.187 | nm |
| Sq | 1951.08 | nm |
| Ssk | -0.578 | |
| Sv | -13526.027 | nm |
| Sz | 23103.216 | nm |

POLYMERIC FILM AND USES THEREOF

CROSS-REFERENCE TO RELATED APPLICATIONS

This application is a U.S. National Stage patent application based on International Patent Application Serial No. PCT/GB2019/053454, filed Dec. 6, 2019, which claims the benefit of United Kingdom Application No. GB 1819929.9, filed Dec. 6, 2018, each of which is hereby incorporated herein by reference in its entirety.

The present invention relates to the field of polymeric films, especially polyester films, which have a matt surface finish. In particular, the invention relates to polymeric films, especially polyester films, which have a printable, matt surface finish.

Polymeric films with at least one matt surface are exploited in many areas of technology. For instance, in many film uses (such as for packaging and/or labels), it is desirable to provide films with a textured and/or highly matt surface (so called "ultra matt") as this mimics the look and feel of paper, which is preferred by many users. Therefore, it is an object of the present invention to provide polymeric films which have a matt, printable, surface finish, preferably wherein the matt surface mimics the look and feel of paper. Such polymeric films are suitable for forming printed substrates, such as those used in packaging and/or as labels. It is also desirable to provide films with a textured and/or highly matt surface for use in cast release applications, i.e. wherein the film is used as a release film to transfer texture to a substrate, such as a plastic substrate.

Adaptations of polymeric films have been proposed in order to tailor the properties of the polymeric film to a particular application. However, an adaptation which improves the performance of a polymeric film in one respect may be detrimental to the performance of the film in another respect. For instance, as discussed below, a modification to increase the mattness of a film may have a detrimental effect on the mechanical properties of the film, such as the delamination resistance of the film. Accordingly, it is often difficult to obtain polymeric films having a suitable combination of desirable properties.

It would be advantageous to provide matt films with an improved surface for printing. To achieve a good printed image, it is convenient if a film surface has a high surface porosity so that the ink can be rapidly absorbed. It is also useful that the ink remains largely near the surface and is absorbed only to a small degree within the interior bulk of the film. This minimizes the volume of ink required to create an image of a given hue or contrast on the film surface. Using less ink means lower costs and/or increased printing speed. Thus, it would be desirable to provide matt films having a suitable balance of properties required for printability, which may be achieved by providing a printable surface which has a surface porosity which is high enough that the ink is rapidly absorbed, and yet not so high that a significant proportion of the ink is absorbed within the interior of the film.

Ideally, the printable surface also needs a sufficient surface area so the ink will be taken up rapidly by the film, for example when the ink is applied by an ink jet printer to a high speed web for label films, so that the image does not smudge or bleed.

However, providing a matt film surface with sufficient porosity and high surface area to be readily printable is very difficult to achieve in practice. Incorporating filler in a film in sufficient amounts to create a highly textured surface with high surface area makes film formation difficult given the larger surface area over which the film surfaces can interact. If the film is multi-layered, a highly textured surface layer may also more readily delaminate from core layers with which the surface layer may be less compatible. It has been difficult to assess the intrinsic properties of the surface of the film to determine which parameters are most important to control surface texture. Thus, it is challenging to develop films that have a printable matt finish without also unintentionally having an adverse impact on other desired film properties (such as increased delamination).

Therefore, to provide a matt printable surface on a film it has been proposed to coat the films with suitable coating compositions. However, coated films have other disadvantages. Often the coatings are not very robust and, for example, may be easily removed by abrasion of the film. It can also be difficult to achieve a highly uniform surface finish with a coating due to the limitations in how a coating composition can be applied in a production environment, especially to a high speed film web on an industrial scale. Coatings are therefore often applied to a film offline in a batch process, which increases cost. It is an object of the present invention to dispense with the coating composition used in existing films by providing a polymeric film which exhibits a matt, printable outer surface.

EP1900515 (U.S. Pat. No. 6,913,817) (Mitsubishi) describes a film comprising a matt overlayer applied to a base layer of PET film.

WO2005-118305 (EP1768806 and U.S. Pat. No. 7,435,462) (Arkema) discloses thermoplastic articles with printable matt surfaces which is said to be achieved by blending inorganic silica particles, having a specific particle size and particle size distribution, into the film surface.

An object of the present invention is to solve some or all of the problems or disadvantages (such as identified herein) with prior art films.

Surprisingly, the applicant has found that by analyzing and controlling certain surface properties of the film and components thereof, improved films can be produced which, for example, have a surface with a highly matt appearance which can be readily printed (e.g. using high speed ink jet printing and/or video jet printing) without the need to coat the film to provide the printable matt surface. Optionally, coatings can still be applied to the film for other reasons (e.g. to provide a durable outer layer after printing).

It would also be advantageous to provide matt films with an improved surface for cast release applications. During cast release, a matt film is disposed against a substrate to provide a texture to the substrate. In other words, the matt texture from the matt film is transferred to the substrate, such that the substrate becomes embossed with a textured surface which is the mirror image of the matt texture from the matt film. It is desirable to create a highly textured surface in order to facilitate the transfer of a texture from the matt film to the substrate. However, it can be difficult to provide a highly textured surface without having an adverse impact on other desired film properties. In particular, it is difficult to provide a film having at least one highly textured surface which does not also exhibit increased delamination, particularly under the manufacturing conditions typically used for such cast release applications.

Additionally, known release films are typically coated with suitable coating compositions to form release coatings. However, as discussed above, coated films have other disadvantages. It is therefore an object of the present invention to dispense with the release coating layer used in existing films by providing a polymeric release film which exhibits a matt outer surface.

Therefore, it is a further object of the present invention to provide a polymeric film which has a matt surface, preferably an ultra matt surface, wherein the film is suitable for use in cast release applications to transfer texture to a substrate material. In particular, it is an object to provide such a film which exhibits improved delamination resistance.

The applicant's use of selection of certain parameters and techniques to characterize the surface of films and/or particles present therein allows the films and/or particles to be selected based on impactful parameters so the films can be prepared more effectively and/or efficiently to meet some or all of the objects of the present invention. The applicant has found that filler materials can be used more cost effectively and/or certain film properties can be reproduced more reliably and consistently by use and selection of fillers having certain parameters. In the past, uncoated, printable, matt films could not be easily or cost effectively manufactured and/or were prepared inconsistently and unreliably by trial and error due to a poor understanding of the impact of surface and particle properties on the film.

It is an object of the present invention to provide a method for controlling the mattness of a film such that matt films can be produced more reliably and consistently.

Furthermore, it is an object of the invention to enable the properties of a polymeric film to be tailored in order to improve its performance in a particular application, for example to improve its performance as a printable film or as a release film for use in cast release applications.

The present invention provides a single layer matt polymeric film comprising a self-supporting film of a polymer A1, wherein the film comprises particles having a volume-weighted mean size ($D_{(4,3)}$) of no more than 25 μm, and wherein the particles are present in an amount of from about 5% to about 35% by volume fraction of the total film.

The present invention also provides a composite multi-layer matt film comprising:

a) a self-supporting first layer A of a film of a first polymer A1;

b) an optional primer layer on said first layer, between said first layer and the second layer;

c) a second layer B of a second polymer B1, being located on the optional primer layer where present, or directly on said first film layer A in the absence of said optional primer layer, the second layer forming a matt, outer surface of the multi-layer film;

wherein the second layer comprises particles having a volume-weighted mean size ($D_{(4,3)}$) of no more than 25 μm, and wherein the particles are present in an amount of from about 5% to about 35% by volume fraction of the second layer B of the film.

Advantageously, in the single layer or multi-layer polymeric film of the present invention, the polymeric film comprises at least one matt surface wherein the properties of the matt surface can be tailored such that it is printable and/or such that it effectively transfers texture when the film is used in cast release applications.

Therefore, broadly in accordance with one aspect of the present invention, there is provided:

a single layer matt, printable film comprising a self-supporting film of a polymer A1 (optionally wherein the polymer is a polyester, preferably PET and/or PEN), optionally wherein said film is oriented in at least one direction), wherein the film comprises particles (preferably inorganic particles, more preferably silica particles), where the particles i) are present in the film in an optional amount of from 3 to 30% by weight, the weight of the film being 100%;

ii) have a volume-weighted mean size ($D_{(4,3)}$) of no more than 25 μm (microns).

Broadly in accordance with another aspect of the present invention there is provided: a composite multi-layer matt, printable film comprising:

a) a self-supporting first layer A of a film of a first polymer A1 (optionally wherein the first polymer is a polyester, preferably PET and/or PEN), optionally wherein said film is oriented in at least one direction;

b) an optional primer layer on said first layer, between said first layer and the second layer;

c) a second layer B of a second polymer B1, being located on the optional primer layer where present, or directly on said first film layer A in the absence of said optional primer layer, (optionally wherein said second polymer is a polyester, preferably PET and/or PEN), the second layer forming a matt, printable outer surface of the multi-layer film; where the second layer comprises particles (preferably inorganic particles, more preferably silica particles), where the particles i) are present in the second layer B in an optional amount of from 3 to 30% by weight, the weight of said second layer being 100%; and ii) have a volume-weighted mean size ($D_{(4,3)}$) of no more than 25 μm.

The amount of particles present in the single layer matt printable film, or in the second layer B of the multi-layer matt printable film, of the invention is preferably from about 23 to about 35% by volume fraction of the total film in respect of said single layer films, or by volume fraction of the layer B in respect of said multi-layer films, the volume of the single layer film or the layer B of which the particles form a part being 100%.

A further aspect of the invention provides a single layer matt film for cast release applications, wherein the film comprises a self-supporting film of a polymer A1 (optionally wherein the polymer is a polyester, preferably PET and/or PEN), optionally wherein said film is oriented in at least one direction), wherein the film comprises particles (preferably inorganic particles, more preferably silica particles), where the particles i) are present in the film in an optional amount of from 3 to 30% by weight, the weight of the film being 100%;

ii) have a volume-weighted mean size ($D_{(4,3)}$) of no more than 25 μm (microns); and iii) are present in the film in an amount of from about 5 to about 23% by volume fraction, the volume of the film being 100%.

Broadly in accordance with another aspect of the present invention there is provided a composite multi-layer matt film for cast release applications, wherein the film comprises:

a) a self-supporting first layer A of a film of a first polymer A1 (optionally wherein the first polymer is a polyester, preferably PET and/or PEN), optionally wherein said film is oriented in at least one direction;

b) an optional primer layer on said first layer, between said first layer and the second layer;

c) a second layer B of a second polymer B1, being located on the optional primer layer where present, or directly on said first film layer A in the absence of said optional primer layer, (optionally wherein said second polymer is a polyester, preferably PET and/or PEN), the second layer forming a matt outer surface of the multi-layer film;

where the second layer comprises particles (preferably inorganic particles, more preferably silica particles), where the particles i) are present in the second layer B in an optional amount of from 3 to 30% by weight, the weight of said second layer being 100%;

ii) have a volume-weighted mean size ($D_{(4,3)}$) of no more than 25 μm; and iii) are present in the second layer in an amount of from about 5 to about 23% by volume fraction, the volume of said second layer of which the particles form a part being 100%.

A yet further aspect of the invention provides a process for manufacturing a polymeric film of the present invention, the process comprising the steps of:

(i) selecting a particulate material having a volume-weighted mean size ($D_{(4,3)}$) of no more than 25 μm;

(ii) adding the particles selected from step (i) to a film forming polymer, optionally to form a master batch composition of said polymer with the particles;

(iii) in an optional blending step, mixing said master batch composition from step (ii) with the same film forming polymer to form a homogenous mixture;

(iv) extruding the polymer mixture from step (ii) or (iii) through a die to form a polymer film with the selected particles dispersed therein;

(v) subsequently to step (iv), heating and stretching the film to orient the film in at least one direction;

where the film is characterised by having particles:

a) present in the film in an optional amount of from 3 to 30% by weight, the weight of the film being 100%;

b) having a volume-weighted mean size ($D_{(4,3)}$) of no more than 25 μm; and c) preferably present in the film in an amount of from about 5 to about 35% by volume fraction, the volume of the film being 100%.

A still further aspect of the invention provides a process for manufacturing a multi-layer polymeric film of the present invention, the process comprising the steps of:

(i) selecting a particulate material having a volume-weighted mean size ($D_{(4,3)}$) of no more than 25 μm;

(ii) adding the particles selected from step (i) to a film forming polymer B1, optionally to form a master batch composition of said polymer B1 with the particles;

(iii) in an optional blending step, mixing said master batch composition from step (ii) with the same film forming polymer B1 to form a homogenous mixture;

(iv) co-extruding the polymer mixture from step (ii) or (iii) through a die together with a film forming polymer A1 to form a multi-layer polymer film having a first layer A of a film of a first polymer A1 and a second surface layer B which comprises the selected particles dispersed within polymer B1;

(v) subsequently to step (iv), heating and stretching the multi-layer film to orient the film in at least one direction;

where the film is characterised by having particles present in the surface layer B:

a) in an optional amount of from 3 to 30% by weight, the weight of the surface layer B being 100%;

b) having a volume-weighted mean size ($D_{(4,3)}$) of no more than 25 μm; and c) preferably present in the second layer B in an amount of from about 5 to about 35% by volume fraction, the volume of said second layer of which the particles form a part being 100%.

A still yet further aspect of the invention provides a method for selecting particles to have a volume-weighted mean size ($D_{(4,3)}$) of no more than 25 μm for use to prepare a film of the present invention, optionally in a process of the present invention.

A still yet further aspect of the invention provides a method for controlling the mattness of a surface of a polymeric film by modulating the surface slope associated with the texturizing features at the surface of the film. The applicant has found that modulating the surface slope enables the formation of films with surfaces of a particular mattness. Thus, it is possible to reliably and effectively provide films with a controlled mattness by modulating the surface slope.

Surprisingly, the applicant has found that films of the invention can be created by selecting particles of the appropriate size parameter to provide films with a surface texture to provide a highly matt appearance and also a high surface area and high surface volume for printability and yet the film can be easily prepared. Without wishing to be bound by any theory it is believed that a high surface area provides a large interface for contact with ink when it is applied to the film and thus provides a high degree of adhesion of the ink to the film surface. It is also believed that a high surface volume provides a large capacity at the film surface which can retain the ink rapidly when it is applied without being wicked away from the surface, in contrast to prior art films that use highly porous coatings. As the ink is held closer to the surface this provides a more intense image for the same quantity of ink. The applicant has provided a solution to address the problem of how and which properties of the film (such as surface texture) and/or particulates included therein can be measured to select films and particles which will provide a film surface which balances the desired optical (e.g. matt) and printability properties with a film that also provides acceptable resistance to delamination of the surface layer (if a multi-layer film).

In preferred embodiments, the present invention provides uncoated printable polyester films having a filler incorporated into the surface layer thereof that provide a matt appearance, with low surface porosity which is nonetheless sufficient to rapidly absorb ink, higher surface area (increased by at least about 1.7 times compared to the unfilled film surface) and/or high surface volume to provide an improved surface ink absorption capacity (e.g. as applied by an ink jet printing) such that a 50 μm inkjet droplet is retained within a 100×100 μm area.

In preferred embodiments of the invention, such matt films (where multi-layer) may have improved resistance to delamination when the film is used in cast release applications compared to prior art laminate matt films of comparable rough surface texture, especially if the intrinsic viscosity of the polymer of the surface layer comprising filler is matched to the polymer of an adjacent core layer.

Matt Surface

As used herein, the term "matt" denotes that the film surface exhibits a 60° gloss of no more than 10 units, preferably no more than 8, preferably no more than 7, preferably no more than 6 units. Preferably a matt film also exhibits an 85° gloss of no more than 10 units, preferably no more than 9 units, preferably no more than 8 units. In one preferred embodiment the 85° gloss is in the range of 5-9 units. In a further particularly preferred embodiment, the 85° gloss is less than 5, preferably less than 4, preferably less than 3, and preferably less than 2 units. Gloss may be measured by any suitable technique well known to those skilled in the art, for instance DIN 67530. Preferably, these gloss values are exhibited in both the transverse and machine directions of a biaxially stretched film.

Printable Surface

As used herein, the term "printable" denotes that when the film surface is printed with an inkjet printer, a 50 μm inkjet droplet is retained within a 100×100 μm area (as evaluated by any suitable imaging technique).

Multi-Layer Films

In one embodiment of the composite multi-layer films of the present invention, said second layer B (comprising second polymer B1 and the particles) may be co-extruded with said first layer A (comprising the first polymer A1) to form a multi-layer co-extruded film comprising at least one layer A adjacent to the second layer B where said layer B forms an outer surface of the multi-layer film. Layer A may form a core layer, e.g. where layer A has another layer C on the opposite surface of core layer A to that facing second layer B. Layer C may be the same or different to layer B (for example having the same particles therein and/or in the same amounts) and/or may form an outer surface of the multi-layer film. Where layers B and C are the same and form outer surfaces of the film, the film is matt and printable on both sides.

The primer layer, if present, may be used to provide a stronger bond between the first layer A and the second layer B, so that the multi-layer film has an improved resistance to delamination. However, depending on the polymers selected for A1 and B1, the primer layer may not be needed.

Thus, in a preferred embodiment of the composite multi-layer films of the present invention, the film has no primer layer but the IV of polymers A1 and B1 are matched as described herein. Thus, in this embodiment it is preferred that the intrinsic viscosities (IV) of polymer A1 and B1 of respective first layer A and second layer B are within +/−10% of the values of each other, more preferably within +/−5%, most preferably within +/−2%, for example have substantially the same IV value. IV values can be modified (i.e. increased) by conventional methods in the art, such as solid state polymerization.

Type of Particles

The particles may be any suitable inert particles selected to have the properties described herein which will survive the film manufacturing process and may be organic, inorganic and/or mixtures thereof. Suitable organic particles may include plastic pigments such as solid bead pigments and microsphere pigments containing voids or vesicles. Preferred particles are inorganic materials, more preferably inorganic fillers and/or pigments, most preferably metal or metalloid oxide, such as alumina, titania, and alkaline metal salts, such as the carbonate and sulphates of calcium and barium. Suitable inorganic pigments may be selected from: barium sulphate, titanium dioxide, iron oxide, zinc oxide, magnesium silicate, calcium carbonate, colored pigments, aluminosilicates, silica, zeolites and/or various clays and may be in any suitable crystalline form and/or be amorphous. For some end uses barium sulphate and/or titanium dioxide may be selected for their ability to provide opacity.

For other films, silica fillers (often used as anti-block agents) may be preferred, for example those silicas available from W R Grace under the trade designations Syloid® 244, Syloid® 620, Sylobloc® 520, Sylysia® 450, Sylobloc® 25B, Syloblock® 45 and/or Syloid® ED2. Similarly suitable silica fillers may be commercially available from PolyOne.

Combinations and/or mixtures of the above ingredients are also possible for use as the particle component of the present invention.

The choice of silica filler may depend on the desired properties of the polymeric film.

For instance, suitable silica fillers typically have a porosity from about 0.4 ml/g to about 2 ml/g. When it is desirable for the polymeric film to exhibit an increased porosity, then it may be advantageous to use a relatively porous silica filler, such as a silica filler having a porosity from about 1 ml/g to about 2 ml/g. For instance, Sylobloc® 45 could be used because it has a porosity of 1 ml/g. On the other hand, when it is desirable for the polymeric film to exhibit a lower porosity, then it may be advantageous to use a less porous silica filler, such as a silica filler having a porosity from about 0.4 ml/g to about 0.95 ml/g. For instance, Sylobloc® 25B could be used because it has a porosity of 0.6 ml/g.

Amount of Particles

The volume concentration of a species of particles is the percentage of the volume occupied by that species of particles, based on the total volume of the composition, dried coating, layer and/or film of which they form a part. Preferred films of the invention comprise or consist of polymer films which contain particles (for example in the second layer B of a multi-layer film or in the film if a single layer) at particle volume concentrations in the range of from a trace amount to 85% by volume, preferably in the range of 1% to 55% by volume. It will be appreciated that in low amounts the particles will need to be of a type that have a high impact on surface texture, and at high amounts of particles the film may be highly opaque and/or pigmented.

The amount of particles present in the single layer film of the invention, or the second layer B of the multi-layer film of the invention, preferably wherein the particles comprise and preferably are inorganic particles (more preferably silica), is preferably from 5 to 35%, preferably from 10 to 25%, even more preferably from 12 to 20%, even more preferably from 12 to 17%, most preferably from 13 to 15%, for example 14% by volume fraction of the total film in respect of said single layer films, or by volume fraction of the layer B in respect of said multi-layer films, the volume of the single layer film or the layer B of which the particles form a part being 100%.

The inventors have found that the volume concentration of the particles affects the porosity of the film and also affects the film's resistance to delamination. When the volume concentration of the particles is high, the particles may not be sufficiently wetted by and incorporated within the polymeric matrix. Accordingly, the particles tend to accumulate at the surfaces of the film. When the film is a multi-layer film, this means that the particles tend to accumulate at the interface between the layer which comprises the particles and the unfilled layer (e.g. between layer B and layer A). The inventors believe that this reduces the interfacial adhesion between the layers of the multi-layer film and therefore increases delamination.

Thus, when a higher porosity is desired, for instance when providing a printable film, it is preferred that higher amounts of particles are present in the single layer film of the invention, or the second layer B of the multi-layer film of the invention. In this embodiment of the invention, the particles are preferably present in amounts of from 23%, preferably from 24%, preferably from 25%, preferably from 26% of the volume fraction of the total film in respect of said single layer films, or by volume fraction of the layer B in respect of said multi-layer films, the volume of the single layer film or the layer B of which the particles form a part being 100%.

Preferably, the particles are present in amounts of less than 35%, preferably less than 33%, preferably less than 30% of the volume fraction of the total film in respect of said single layer films, or by volume fraction of the layer B in respect of said multi-layer films, the volume of the single layer film or the layer B of which the particles form a part being 100%.

However, for some uses, a higher porosity is not particularly required and, instead, it is more desirable to improve delamination resistance. For instance, this combination of properties is desired when providing a film for cast release applications. In this embodiment, the particles are preferably present in amounts of from 5 to 24%, preferably from 5 to 23%, preferably from 10 to 23%, preferably from 14 to 22% of the volume fraction of the total film in respect of said single layer films, or by volume fraction of the layer B in respect of said multi-layer films, the volume of the single layer film or the layer B of which the particles form a part being 100%.

The amount of particles present in the single layer film of the invention, or the second layer B of the multi-layer film of the invention, preferably wherein the particles comprise and preferably are inorganic particles (more preferably silica), may also be measured by their weight concentration, in which case, the particles may be present in an amount of from 3 to 30%, preferably from 5 to 26%, even more preferably from 7 to 20%, even more preferably from 7 to 17%, most preferably from 8 to 15%, for example 10%, or for example 12.5%, or for example 15% by weight, the weight of the total film or layer B of which the particles form a part being 100%.

Preferably, the particles are present in an amount of from greater than 8%, for example from 9% by weight, the weight of the total film or layer B of which the particles form a part being 100%. For example, the particles may be present in an amount of from greater than 8% to 30%, preferably from greater than 8% to 26%, even more preferably from greater than 8% to 20%, most preferably from greater than 8% to 15% by weight. For example, the particles may be present in an amount of from 9% to 30%, preferably from 9% to 26%, even more preferably from 9% to 20%, most preferably from 9% to 15% by weight.

The skilled person would be aware that the preferred volume concentration of the particles can be converted into preferred weight concentrations depending on the density of the particles.

Preferably, when providing a printable film, the particles comprise a porous silica filler, preferably Sylobloc® 45B, in an amount of from about 10% to about 20% by weight, preferably about 15% by weight, the weight of the total film or layer B of which the particles form a part being 100%. The particles may consist essentially of, or consist of, said Syloblock® 45B.

Preferably, when providing a film for cast release applications, the particles comprise a less porous silica filler, preferably Sylobloc® 25B, in an amount of from about 5% to about 15% by weight, preferably from about 8% to about 12% by weight, preferably about 10% by weight, the weight of the total film or layer B of which the particles form a part being 100%. The particles may consist essentially of, or consist of, said Sylobloc® 25B.

Particle Size Values

The applicant has found that selecting particles having a volume-weighted mean size ($D_{(4,3)}$) of no more than 25 μm, preferably in the range of 0.1 to 25 μm, and incorporating them into a single layer film or a surface layer B of a multi-layer film provides a means to produce a film having a printable matt surface without the need to add a matt or printable coating thereon.

Furthermore, the applicant has found that selecting particles having a volume-weighted mean size ($D_{(4,3)}$) of no more than 25 μm, preferably in the range of 0.1 to 25 μm, and incorporating them into a single layer film or a surface layer B of a multi-layer film provides a means to produce a film having a matt surface wherein the matt surface is suitable for transferring texture to a substrate in cast release applications.

Preferably the particles used in the present invention have a volume-weighted mean size ($D_{(4,3)}$) of no more than 10 μm, preferably no more than 8 μm, preferably no more than 7 μm, more preferably no more than 5 μm, even more preferably no more than 4 μm, most preferably no more than 3 μm.

Of particular utility in the present invention are particles which have a volume-weighted mean size ($D_{(4,3)}$) of no more than 5 μm.

The volume-weighted mean size ($D_{(4,3)}$) of the particles is preferably at least 0.1 μm, preferably at least 1 μm and preferably at least 2 μm.

Preferably, the particles used in the present invention have a volume-weighted mean size ($D_{(4,3)}$) of from about 2 μm to about 8 μm, preferably from about 2 μm to about 7 μm, preferably from about 2 μm to about 6 μm, most preferably from about 2 μm to about 5 μm.

The volume-weighted median particle size ($D_{(v,50)}$) is preferably in the range of 0.1 to 20 μm, preferably 2 to 8 μm.

The $D_{(3,0)}$ particle size is preferably in the range of 1.5 to 5 μm, preferably from 2 to 4 μm, preferably about 2 μm or about 3 μm or about 4 μm.

Unless it is clear from the context or otherwise indicated herein the particle size values given herein are measured by laser diffractometry. A suitable instrument which may be used to measure particle size from laser diffraction is a 'Coulter LS13320 Particle Size Analyser'. Particle size is preferably determined by the method described in ISO 13320.

A normal particle size distribution (PSD) with single maximum peak (mono modal) is preferred for the particles used in the present invention. The inventors have found that a mono modal distribution of particles results in a more efficient provision of mattness. However other PSDs (e.g. multimodal such as bimodal) are not excluded from this invention. As is well-known in the art, PSD can be represented by parameters such as the $D_{90}$, $D_{50}$ or $D_{10}$ parameters, which represent the cumulative amount of particles (e.g. determined by volume or number) which lie below a given size.

Film Forming Polymers

The polymer(s) (e.g. polymers A1 and B1 referred to above) of the single layer and multi-layer films of the present invention, prior to deposition of any coating or further layer, may be any suitable polymer than is capable of forming a film. Suitable polymers may thus comprise; polyolefins [e.g. polypropylene (PP) and/or polyethylene (PE)]; polyurethanes; polyvinylhalides [e.g. PVC]; polar polymers, polyesters [e.g. polyethylene terephthalate—PET] or other polyesters as described herein, polyamides [e.g. nylons], polyaryletherketones, and/or non-hydrocarbon polymers; suitable combinations and/or mixtures thereof.

Usefully the polymer(s) is/are selected from a polyolefin and/or a polar polymer.

The film-forming polymer may be a homopolymer or a copolymer. Homopolymers are particularly useful as layer A in a multi-layer film, particularly wherein the polymer layer A is a PET layer.

Polymers A1 and B1 which form respective layers A and B of a multi-layer film of the invention may be the same or different. Preferably, both polymers are independently selected from any of the film forming polymers described herein (usefully selected from PET or PEN polymers, most usefully PET polymers).

The polymer film (and/or layer) described herein may be crystalline, semi-crystalline or randomly oriented amorphous polymer chains.

Polyolefin Films

Conveniently, the polyolefin to be used as the film and/or layer in the present invention may comprise one or more polyolefins [e.g. polypropylene homopolymer, polyethylene homopolymer (e.g. linear low-density polyethylene—LLDPE) and/or polypropylene/polyethylene copolymer(s)], optionally in one or more layers. The constituent polymers and/or layer(s) in a film of the present invention may be oriented, blown, shrunk, stretched, cast, extruded, co-extruded and/or comprise any suitable mixtures and/or combinations thereof. The polymer film and/or layer(s) may optionally be crosslinked by any suitable means such as electron beam (EB) or UV crosslinking, if necessary by use of suitable additives in the film.

The definition of polyolefin, as intended herein, is a polymer assembled from a significant percentage, preferably ≥50% by weight of one or more olefin monomers. A copolymer is a polymer assembled from two or more monomers. Polyolefin films may include, but are not limited to, polyethylene homopolymers, ethylene-α-olefin copolymers, polypropylene-α-olefin copolymers, polypropylene homopolymers, ethylene-vinyl acetate copolymers, ethylene-methacrylic acid copolymers and their salts, ethylene-styrene polymers and/or blends of such polymers.

Polyolefins suitable for forming the layer of polymer film used in the present invention may include any of the polyolefins described herein which are capable of being formed into a film (filmable) alone (i.e. as a substantially pure polymer) and/or in a mixture and/or copolymer with other polymers (such as any described herein). Preferred polyolefin films are polypropylene (PP) and/or polyethylene (PE), biaxially orientated polypropylene (BOPP) film being more preferred.

Films of Polar Polymers (Including Polyester)

As used herein the term “polar polymer” denotes a polymer which is obtained and/or obtainable from at least one polymer precursor which itself comprises one or more polar moieties and/or where the polymer comprises a repeat unit comprising one or more polar moeities. One example of such a polar moeity is a carbonyloxy moiety. The term polar polymer does not therefore necessarily imply any common properties in the resultant polymer or in films made therefrom. Usefully the polar polymers comprise polyester polymers and/or polyaryletherketone polymers.

Examples of polar polymers comprise polyaryletherketones; polyesters that comprise polyethylene terephthalate (PET); polylactate (PLA), polyhydroxybutyrate (PHB), polyfuranoate (PEF) and/or polyethylene napthalate (PEN); copolyesters comprising or consisting of repeat units of any of the foregoing (or any other polyesters described herein) such as: terephthalic acid, lactic acid, hydroxybutyric acid, furanoic acid, napthalic acid and/or aliphatic dicarboxylic acids and diols; for example copolyesters of terephthalic acid, napthalic acid and/or aliphatic dicarboxylic acids and diol. Further examples of suitable polar polymers are described herein. Polyesters are particularly preferred to form the self supporting film and/or layers thereof described herein.

Polyesters suitable for forming the layer of polymer film used in the present invention may include any of the following which are capable of being formed into a film alone and/or in a mixture and/or copolymer with other polymers (such as any other polymers, e.g. polyesters, described herein):

- Aliphatic polyester homopolymers such as polyglycolide or polyglycolic acid (PGA), polylactic acid (PLA), polycaprolactone (PCL), polyhydroxyalkanoate (PHA) and/or polyhydroxybutyrate (PHB).
- Aliphatic polyester copolymers such as polyethylene adipate (PEA), polybutylene succinate (PBS) and/or poly (3-hydroxybutyrate-co-3-hydroxyvalerate) (PHBV).
- Semi-aromatic polyester copolymers such as polyethylene terephthalate (PET), polybutylene terephthalate (PBT), polytrimethylene terephthalate (PTT), polyethylene naphthalate (PEN) and/or polyethylene furanoate (PEF).
- Aromatic polyester copolymers such as the polymer obtained and/or obtainable by polycondensation of 4-hydroxybenzoic acid and 6-hydroxynaphthalene-2-carboxylic acid and available commercially from Kuraray under the tradename Vectran™.

Also suitable for use in the present invention are filmable polar polymers such as polyaryletherketones (PAEK), e.g. polyether ether ketone (PEEK) available commercially from Victrex Plc under the registered trademark Victrex®.

Polyesters and/or polyaryletherketones suitable for use as the film layer of a polar polymer in the present invention may comprise at least one polymer selected from the group consisting of: aliphatic polyester homopolymers (such as PGA, PLA, PCL, PHA and/or PHB); aliphatic polyester copolymers (such as PEA, PBS and/or PHBV); semi-aromatic polyester copolymers (such PET, PBT, PTT, PEN and/or PEF); aromatic polyester copolymers (such as Vectran™), PEEK polymers (such as those available commercially under the registered trademark Victrex®), any suitable mixtures, combinations and copolymers thereof.

Preferred polymers suitable for use as the polar polymer film layer in the present invention comprise at least one polymer selected from the group consisting of: PGA, PLA, PCL, PHA, PHB, PEA, PBS, PHBV, PET, PBT, PTT, PEN, PEF, Vetran®, PEEK and/or any suitable mixtures, combinations and copolymers thereof.

More preferred polyesters suitable for use as a polyester film layer in the present invention comprise at least one polyester selected from the group consisting of: PLA, PHB, PET, PEN, PEF, any suitable mixtures, combinations and copolymers thereof.

Even more preferred polyesters suitable for use as a polyester film layer in the present invention comprise at least one polymer selected from the group consisting of: PET, PEN and PEF.

Most preferred polyesters suitable for use as a polyester film layer in the present invention comprise at least one polymer selected from the group consisting of: PET and PEN.

For example polyesters suitable for use as a polyester film layer in the present invention comprise at least one PET polymer.

Where the polymer in a particle-containing layer, i.e. polymer A1 or B1 in a layer A or B as described above, is a polyester (such as PET or PEN, particularly PET), it is preferred that the polyester is a copolyester further comprising a comonomer in the dicarboxylic acid fraction. Preferably, the comonomer is an aromatic dicarboxylic acid, preferably selected from isophthalic acid (IPA). The comonomer may be present in the polymer in an amount of from about 3 to about 20 mol %, preferably from about 5 to about 20 mol %, preferably from about 5 to about 18 mol %. In one preferred embodiment, the comonomer is present in an amount of from about 5 to about 10 mol %, preferably from about 5 to about 8 mol %. In this context, the molar amount is defined as a proportion of the relevant di-acid or diol fraction of which the comonomer forms a part. Thus, a PET-based copolyester comprising an IPA content of 15 mol % is a copolyester of terephthalic acid (TA), isophthalic acid and ethylene glycol (EG) in the proportions 85:15:100 (TA:IPA:EG). The inventors have surprisingly found that such copolyesters improve wetting of the polymeric matrix to the high surface area of inorganic filler particles delivered by the relatively high volume fraction thereof which are incorporated into the matt layer. In addition, such copolyesters improve the interfacial adhesion and delamination resistance between two polymer layers, particularly two IV-matched polymer layers, in the multi-layer embodiments of the present invention.

Film Manufacture

Polymeric resins used to produce the films of the present invention are generally commercially available in pellet form and may be melt blended or mechanically mixed by well-known methods known in the art, using commercially available equipment including tumblers, mixers and/or blenders. The resins may have other additional resins blended therewith along with well-known additives such as processing aids and/or colorants. Methods for producing polymer films are well-known and include the techniques of casting films as thin sheets through narrow slit dies, and blown-film techniques wherein an extruded tube of molten polymer is inflated to the desired bubble diameter and/or film thickness. For example, to produce a polymeric film, the resins and additives may be introduced into an extruder where the resins are melt plastified by heating and then transferred to an extrusion die for formation into a film tube. Extrusion and die temperatures will generally depend upon the particular resin being processed and suitable temperature ranges are generally known in the art or provided in technical bulletins made available by resin manufacturers. Processing temperatures may vary depending upon process parameters chosen.

The films of the present invention may be unoriented (cast film), preferably may be orientated in at least one direction (monoaxially orientated), more preferably orientated in two directions (biaxially orientated).

Orientation of the film of the present invention may be achieved by stretching the film at a temperature above the glass transition temperature (Tg) of its constituent polymer(s). The resultant oriented film may exhibit greatly improved tensile and stiffness properties. Orientation may be along one axis if the film is stretched in only one direction, or may be biaxial if the film is stretched in each of two mutually perpendicular directions in the plane of the film. A biaxially oriented film may be balanced or unbalanced, where an unbalanced film has a higher degree of orientation in a preferred direction, usually the transverse direction. Conventionally the longitudinal direction (LD) is the direction in which the film passes through the machine (also known as the machine direction or MD) and the transverse direction (TD) is perpendicular to the MD. Preferred films are oriented in both MD and TD. Orientation of the film may be achieved by any suitable technique. For example a flat film may be oriented by simultaneous or sequential stretching in each of two mutually perpendicular directions by means of a stenter, or by a combination of draw rolls and a stenter. In a bubble process a film is extruded in the form of a composite tube which is subsequently quenched, reheated, and then expanded by internal gas pressure to oriented in the TD, and withdrawn, at a rate greater than that at which it is extruded, to stretch and orient it in the MD.

The film of the polymer layer is self-supporting, and it is preferred to be a biaxially oriented film optionally a polar polymer or a polyolefin. The film polymer may optionally other additives (such as slip additives and/or anti-block additives).

The film constituting the layer of polymer may have shrinkage of less than 5% in length and/or width upon exposure to boiling water for five seconds.

Preferably, the total thickness of the film of the present invention is in the range of from about 10 μm to about 500 μm, preferably in the range of from about 20 μm to about 250 μm, preferably in the range of from about 20 to about 125 μm.

Preferably, when the film is a multi-layer film, the thickness of the layer which contain particles (for example in the second layer B) is less than about 40%, preferably less than about 30%, preferably less than about 25%, preferably about 20%, of the total thickness of the multi-layer film.

EMBODIMENTS OF THE INVENTION

Usefully the inorganic particles used in the present invention are added to polymer B1 (or the single polymer A1 if a single layer film) in a master batch and the master batch is diluted with other polymer (preferably the same as the original) and then used to prepare the second particle containing layer or sole layer.

The applicant has found that rough surface texture generated by adding the filler particles generates almost twice the surface area (×1.7) compared to unfilled film and also increases volume capacity of the film surface to hold ink. Both these surface parameters have been found useful to prepare matt printable films. From the surface volume analysis it would appear when extrapolated that the matt film of the invention has the capacity at its surface to hold an inkjet droplet of diameter 50 μm (micron) within a 100×100 μm area on the film surface. Without wishing to be bound by any theory, the applicant believes that an inkjet printing ink which is typically dispersed in a polar medium such as a glycol may provide sufficient van der Waals force so the ink adheres to the film surface as the films of the invention provide sufficient surface interface and volume capacity for the droplet volume of ink to be taken up and retained at the film surface.

Films of the invention prepared with surface filler particles selected as described herein have been found to have a surface texture with sufficient balance of surface area and surface volume so that images formed by inkjet printing on the uncoated surface have a very good hue, and good contrast, with no bleeding or smudge. Without wishing to be bound by any theory, the applicant believes that films of the invention have both a very high surface area which provides a large interface for contact with ink applied to the film (and thus a high degree of adhesion thereto) and also a high surface volume which provides a large capacity at the film surface which can retain the ink to create better quality images (more intense, higher hue, more contrast, less bleeding and/or less smudging) for a given volume of ink.

Thus, in a particularly preferred embodiment, the film of the present invention exhibits at least one surface which is a matt, printable surface which is uncoated. Where the film is a multi-layer film as described herein, said second layer B is uncoated. Thus, advantageously, the preferred films of the present invention do not comprise a coating such as an ink-receptive coating on the matt, printable surface thereof.

In a preferred embodiment of the present invention, there is provided a multi-layer film (such as a multi-layer polyester film with silica particles incorporated in the surface layer) having a matt surface, having a limited degree of surface porosity and sufficient surface area to improve uptake of ink, e.g. as applied by an inkjet printer (for example for use as an external label) and/or which optionally have improved resistance to delamination when the film is used in cast release applications as compared to known, prior art, matt films because the intrinsic viscosities of the surface and core polyester layers have been matched.

It is believed that films of the invention enable better quality images to be printed thereon and/or more cost-effective use of ink, compared to conventional film coatings used for printing (e.g. inkjet printing) which rely on surface porosity to achieve printability. The prior art printable film coatings take more ink away from the surface which requires more ink to achieve a given intensity of surface image. In contrast, the films of the invention provide more balanced properties as they have a sufficient degree of surface porosity such that the ink is rapidly absorbed, and yet not so high that a significant proportion of the ink is absorbed within the interior of the film.

The inventors have found that the porosity of the film is an important characteristic to control in order to tailor the film to improve its performance in a particular application.

It is preferred that the Gurley porosity of the films of the present invention is from about 25,000 to about 500,000 seconds.

When providing a printable film, it is preferred that the Gurley porosity of the film is from about 25,000 to about 250,000 seconds. Preferably, the Gurley porosity is from about 25,000 to about 200,000, preferably from about 27,500 to about 150,000, preferably from about 30,000 to about 115,000, preferably from about 40,000 to about 110,000, preferably from about 50,000 to about 90,000, preferably from about 60,000 to about 85,000, preferably from about 65,000 to about 80,000 seconds, most preferably about 75,000 seconds. If the Gurley porosity is too high then the film is too non-porous which means that the film cannot rapidly absorb the ink. However, if the Gurley porosity is too low then the film may be too porous, such that the ink is absorbed within the body of the film and wicked away from the surface.

When providing a film for cast release applications, it is preferred that the Gurley porosity of the film is from about 250,000 seconds to about 500,000 seconds. Preferably, the Gurley porosity is from about 260,000 to about 450,000 seconds, preferably from about 280,000 to about 430,000 seconds, preferably from about 300,000 seconds to about 400,000 seconds. The film is thus relatively non-porous, which tends to improve the delamination resistance of the film, particularly between the core and surface layers of the multi-layer film of the present invention.

The Gurley porosity is measured according to TAPPI/AINSI T 460 om-11, and is defined as the time it takes for 100 $cm^3$ to pass through 1 $inch^2$ of a substrate under a pressure differential of 1.22 kPa.

Printable Films

In a further aspect of the invention, there is provided a printed film, wherein the film is a single or multi-layer film as described herein which exhibits at least one matt, printable surface, and wherein said printed film comprises an ink layer disposed directly on said matt printable surface. Where the film is a multi-layer film as described herein, the ink is directly disposed on said second layer B. In this context, the term "directly" means that the ink is disposed on the film surface without an intervening coating layer, such as an ink-receptive coating. It will be appreciated that in this aspect of the invention, the matt printable surface is necessarily uncoated.

In a further aspect of the invention, there is provided the use of a film, wherein the film is a single or multi-layer film as described herein which exhibits at least one matt, printable surface which is uncoated, as a substrate for a printing process comprising application of an ink layer directly on to said matt printable uncoated surface.

In a further aspect of the invention, there is provided a method of printing on a substrate comprising the steps of:

(i) providing a single or multi-layer film as described herein which exhibits at least one matt printable uncoated surface, and (ii) disposing an ink layer directly on to said matt printable uncoated surface.

Preferably, the ink is disposed by an ink-jet printing method or a video-jet printing method.

Films for Cast Release

In a further aspect of the invention, there is provided the use of a film, wherein the film is a single or multi-layer film as described herein which exhibits at least one matt surface, in a cast release application.

In a further aspect of the invention, there is provided a method of cast release comprising the steps of:

(i) providing a single or multi-layer film as described herein which exhibits at least one matt surface, (ii) disposing a substrate against said matt surface, (iii) pressing the substrate and film together under increased temperature and pressure such that the texture of the matt surface is transferred onto the substrate, and (iv) removing the film in order to obtain a textured substrate.

During this method, the texture of the matt surface is transferred onto the substrate such that an impression of the matt surface is embossed onto the substrate. This can be useful in the formation of textured substrates, such as textured plastic substrates. Textured plastic substrates are widely used in electronic products and mechanical products, such as casings, housings of computers or cellphones, keyboards etc.

Preferably, the substrate is a plastic substrate.

Optionally, the plastic substrate is provided in a flowable state. Thus, step (ii) of the method may comprise disposing the flowable material onto the matt surface, heating, curing and cooling to consolidate the substrate into a continuous self-supporting film disposed against said matt surface.

The single or multi-layer film of the present invention is often provided wound in a roll form. Thus, it may be necessary to unwind the roll before the substrate is disposed in step (ii).

The further aspects of the invention described herein preferably interrelate such that all optional and/or preferred features of, for example, the polymeric film shall be understood also to be optional and/or preferred features analogously in the context of further aspects of the invention.

Measurement of Surface Roughness

Certain measurement methods may be used to characterise the surface roughness of the films of the present invention using parameters and terms used in the art of interferometry, in particular coherence scanning interferometry, according to ISO 25178. Unless otherwise indicated to the contrary herein, vertical scanning interferometry (VSI measurement mode) was conducted in order to measure the surface roughness. Typically 1.2×0.9 mm fields of view with optical lateral resolution of 0.4 μm and detector lateral resolution of 0.2 μm were used, with an average of 3 measurements and modulation threshold of 2%, in order to produce good surface roughness representation. ISO 25178 parameters such as Sa and Sq were determined from these measurements, as well as Surface Area, Surface Volume and Surface Slope.

Surface slope as used herein is defined on page 7, lines 1 to 20 of WO2014-045038, which states that an important topographical parameter in interferometric profilometery is the X and/or Y slopes associated with a surface feature. Slope information may be expressed in a number of ways, for instance, as the maximum slope or the (arithmetic) mean slope of the feature. The maximum slope of the surface feature is the maximum gradient that it, or its tangent in the case of a curved profile, makes with a line parallel to the mean plane. The X and Y slopes are calculated by comparing the height of a pixel with the height of the next pixel, which is in the X-direction for the X-slope values and in the Y-direction for the Y-slope values. The slope calculation used for surface slope as defined herein is preferably the slope between adjacent pixels calculated as:

$$\text{slope} = \frac{1}{d0}|Z_{j+1} - Z_j|$$

where d0 is the lateral spacing of the profile points $Z_j$; and

Z is the height of the data-point relative to the mean plane.

The surface slope is measured according to Bruker's vision software, version 5.7, update 1. The surface slope is measured along the X-direction and the Y-direction, which correspond to the machine direction (MD) and transverse direction (TD) of a biaxially oriented film. When the film is isotropically drawn, i.e. when the film has been stretched in the same amounts in the MD and in the TD, the surface slope in the X-direction is equivalent to the surface slope in the Y-direction.

Films of the invention are preferably characterized by one or more, preferably by two or more, more preferably by all three of the properties: Sa, Sq, and/or Sz. These properties are calculated by suitable software in equipment that takes images of the film surface.

Sa also known as arithmetic average (AA) or centre line average (CLA) provides one indication of the roughness average of a surface which may be calculated from measurements obtained by any suitable techniques known to those skilled in the art. Sa is the arithmetic average of the absolute values of the roughness profile ordinates and is the area between the roughness profile and its mean line, or the integral of the absolute value of the roughness profile height over the length over which the profile was evaluated.

Films of the invention preferably exhibit a Sa of from 0.01 μm (microns) to 10 μm (microns), preferably from 0.1 μm (microns) to 5.0 μm (microns), more preferably from 0.2 μm (microns) to 3.0 μm (microns), even more preferably from 0.3 μm (microns) to 2.0 μm (microns), most preferably from 0.4 μm (microns) to 1.0 μm (microns), for example about 0.7 μm (microns), e.g. 0.65 μm (microns).

Films of the invention are preferably also characterized by a Sa of at least 0.01 μm (microns), usefully at least 0.1 μm (microns) more usefully at least 0.2 μm (microns), even more usefully at least 0.3 μm (microns), most usefully at least 0.4 μm (microns).

Films of the invention are preferably also characterized by a Sa of no more than 10 μm (microns), conveniently no more than 5.0 μm (microns), more conveniently no more than 3.0 μm (microns), even more conveniently no more than 2.0 μm (microns), most conveniently no more than 1.0 μm (microns).

Sq denotes the root mean square (RMS) which is another indication of the roughness of a surface.

Films of the invention are preferably characterized by a Sq of from 0.01 μm (microns) to 10 μm (microns), preferably from 0.1 μm (microns) to 5.0 μm (microns), more preferably from 0.3 μm (microns) to 4.0 μm (microns), even more preferably from 0.5 μm (microns) to 3.0 μm (microns), most preferably from 0.7 μm (microns) to 2.0 μm (microns), for example about 0.9 μm (microns), e.g. 0.85 μm (microns).

Films of the invention are preferably also characterized by a Sq of at least 0.01 μm, usefully at least 0.1 μm more usefully at least 0.3 μm, even more usefully at least 0.5 μm, most usefully at least 0.7 μm.

Films of the invention are preferably also characterized by a Sq of no more than 10 μm, conveniently no more than 5.0 μm, more conveniently no more than 4.0 μm, even more conveniently no more than 3.0 μm, most conveniently no more than 2.0 μm.

$S_z$ (or Sz) denotes the average maximum height of profiles of a surface. Sz is the arithmetic mean value of the single roughness depths of consecutive sampling lengths. Z is the sum of the height of the highest peaks and the lowest valley depth within a sampling length.

Films of the invention are preferably characterized by a Sz of from 1 μm to 30 μm, preferably from 3 μm to 25 μm, more preferably from 4 μm to 20 μm, even more preferably from 6 μm to 15 μm, most preferably from 8 μm to 10 μm, for example about 9 μm e.g. 9.0 μm.

Films of the invention are preferably also characterized by a Sz of at least 1 μm, usefully at least 3 μm more usefully at least 4 μm, even more usefully at least 6 μm, most usefully at least 8 μm.

Films of the invention are preferably also characterized by a Sz of no more than 30 μm, conveniently no more than 25 μm, more conveniently no more than 20 μm, even more conveniently no more than 15 μm, most conveniently no more than 10 μm.

Films of the invention are preferably also characterized by an X-direction surface slope of 10° or more, preferably 12° or more, preferably 15° or more, preferably 17° or more, preferably 18° or more, preferably 19° or more, preferably 20° or more. These surface slope values are preferably exhibited in both the X- and Y-directions of a biaxially stretched film.

The invention also provides a method for controlling the mattness of a surface of a polymeric film by modulating the surface slope associated with the texturizing features at the surface of the film. Thus, the surface slope can be modulated in order to provide films wherein the surface has particular mattness.

In one embodiment, the method comprises modulating the surface slope to greater than 15° such that the film surface exhibits a 60° gloss of no more than 10 units. This surface slope is preferably defined as the X-direction surface slope. Preferably, the surface slope value is exhibited in both the X- and Y-directions of a biaxially stretched film.

In one embodiment, an "ultra matt" film can be provided. As used herein, the term "ultra matt" denotes that the film surface exhibits a 60° gloss of no more than 7 units, preferably no more than 6 units, and preferably no more than 5 units. Thus, the method may comprise modulating the surface slope to greater than 17° such that the film surface exhibits a 60° gloss of no more than 7 units. Preferably, the method may comprise modulating the surface slope to greater than 20° such that the film surface exhibits a 60° gloss of no more than 5 units.

In one embodiment, the method comprises modulating the surface slope to between about 6° and about 10° such that the film surface exhibits a 60° gloss of between about 20 units and about 45 units.

In one embodiment, a "smooth matt" film can be provided. As used herein, the term "smooth matt" denotes that the film surface exhibits a 60° gloss of between 45 units and 60 units. Thus, the method may comprise modulating the surface slope to less to less than about 6°, preferably to 5° or less, such that the film surface exhibits a 60° gloss of between about 45 units and about 60 units.

The surface slope may be modulated by the addition of particles having a volume-weighted mean size ($D_{(4,3)}$) of no more than 25 μm. Preferably, the particles are present in the single layer film, or the second layer B of the multi-layer film, in an amount of from 3 to 30% by weight, the weight of the single layer film or the layer B in respect of said multi-layer films, being 100%. Preferably, the particles are present in the single layer film, or the second layer B of the multi-layer film, in an amount of from 3 to 35% by volume fraction, the volume of the single layer film or the layer B in respect of said multi-layer films, being 100%. Particles suitable for modulating the surface slope may include any of the particles described herein, in any of the amounts described herein.

Definitions

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate and/or suitable.

The term "consisting essentially of" as used herein will be understood to mean that the following list is substantially exhaustive so generally substantially comprises the listed component(s) as the substantial component(s) thereof, the list being substantially free of other component(s). Thus for example whilst a small number and/or quantity of other additional and/or suitable items may be foreseen, such items would be present to a limited extent consistent with the definitions of "suitable", "substantially" and/or "substantially-free" as defined further herein.

The term 'consisting of' as used herein will be understood to mean that the following list is exhaustive so contains the listed component(s) only and excludes other additional items.

The terms 'effective', 'acceptable' 'active' and/or 'suitable' (for example with reference to any process, use, method, application, preparation, product, material, formulation, compound, monomer, oligomer, polymer precursor, and/or polymers of the present invention and/or described herein as appropriate) will be understood to refer to those features of and/or used on the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises use of a film and/or particles incorporated therein to provide a printable surface with a matt appearance.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise) to encompass both of two alternatives, firstly a broader alternative that the substance may optionally not be present (when the amount is zero) or present only in a de minimis amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein. In the present invention, unless the context clearly indicates otherwise, an amount of an ingredient stated to be present in a polymer of the invention (e.g. an alcohol used to form a copolyester) when expressed as a weight percentage, is calculated based on the total amount of polymer precursors (such as polymers, oligomers and/or monomers) that form the polymer (e.g. by a polymerization and/or polycondensation) being equivalent to 100%.

Substantially

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

Improvements/Comparable Properties

Films and particles of and/or used in the present invention may also exhibit improved properties with respect to known films that are used in a similar manner.

Improved properties as used herein means the value of the component and/or the composition of and/or used in the present invention is >+8% of the value of the known reference component and/or composition described herein, more preferably >+10%, even more preferably >+12%, most preferably >+15%.

Comparable properties as used herein means the value of the component and/or composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

Standard Conditions

As used herein, unless the context indicates otherwise, standard conditions (e.g. for drying a film) means a relative humidity of 50%±5%, ambient temperature (23° C.±2°) and an air flow of ≤(less than or equal to) 0.1 m/s.

EMBODIMENTS

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination of any of the embodiments or other preferred features described herein. Many other variations embodiments of the invention will be apparent to those skilled in the art and such variations are contemplated within the broad scope of the present invention.

Further aspects of the invention and preferred features thereof are given in the claims herein.

FIGURES

The invention is illustrated by the following non-limiting figures where:

Figure 5:
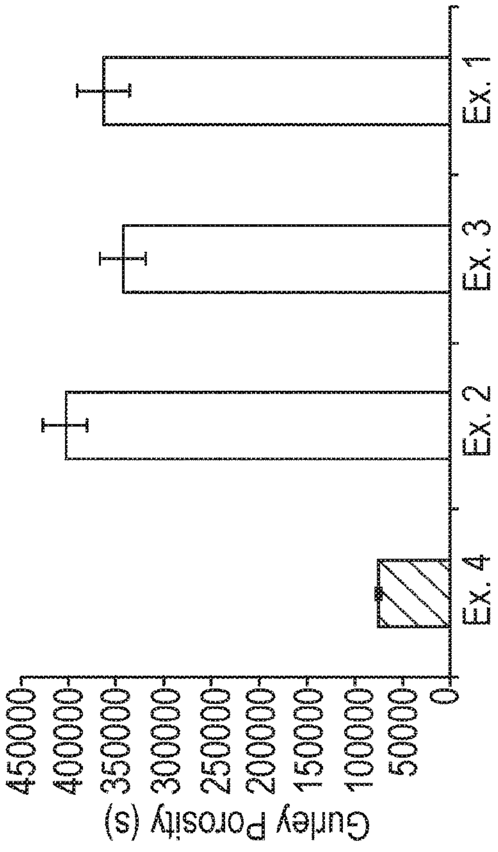

FIG. 5 provides the Gurley Porosity measurements of the films of Examples 1 to 4.

Figure 6A:
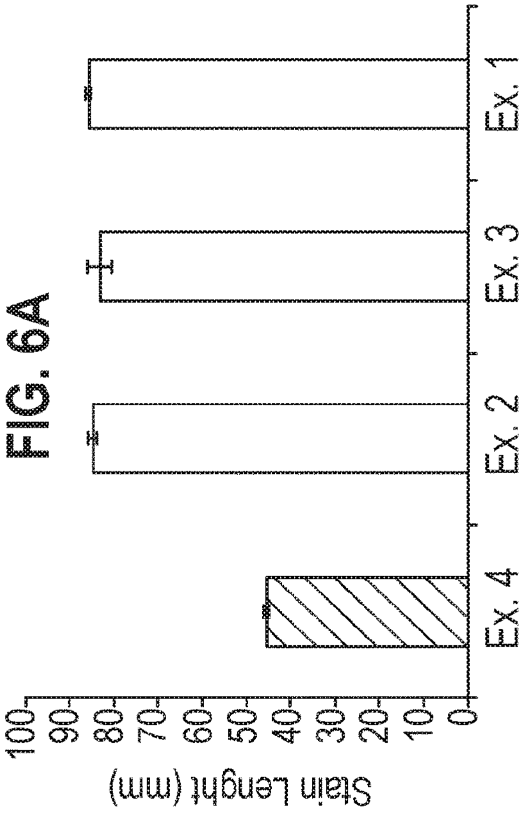
Figure 6B:
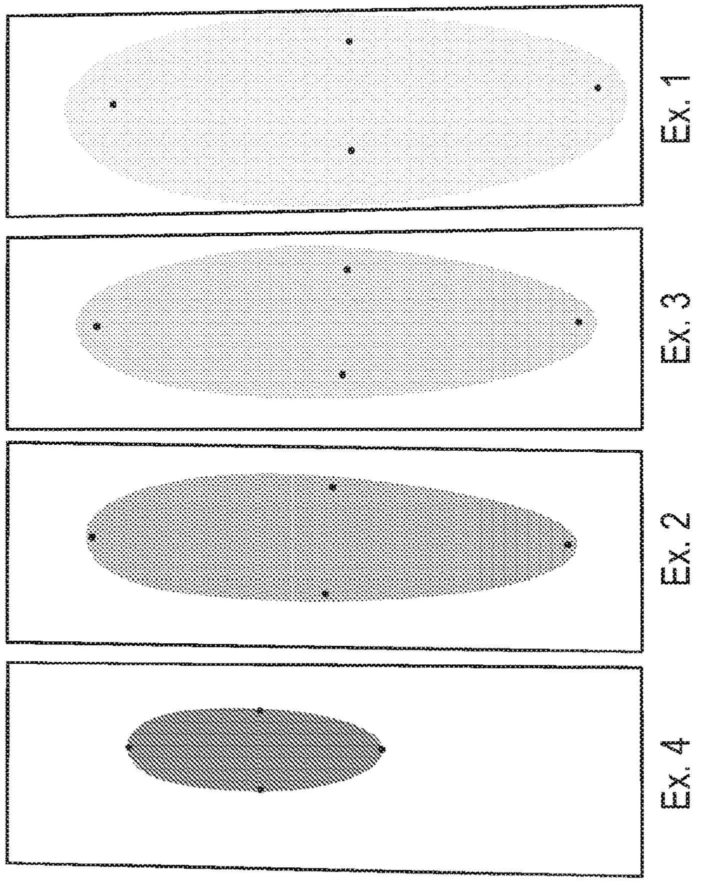

FIGS. 6A and 6B provide the stain length measurements of the films of Examples 1 to 4.

Figure 7A:
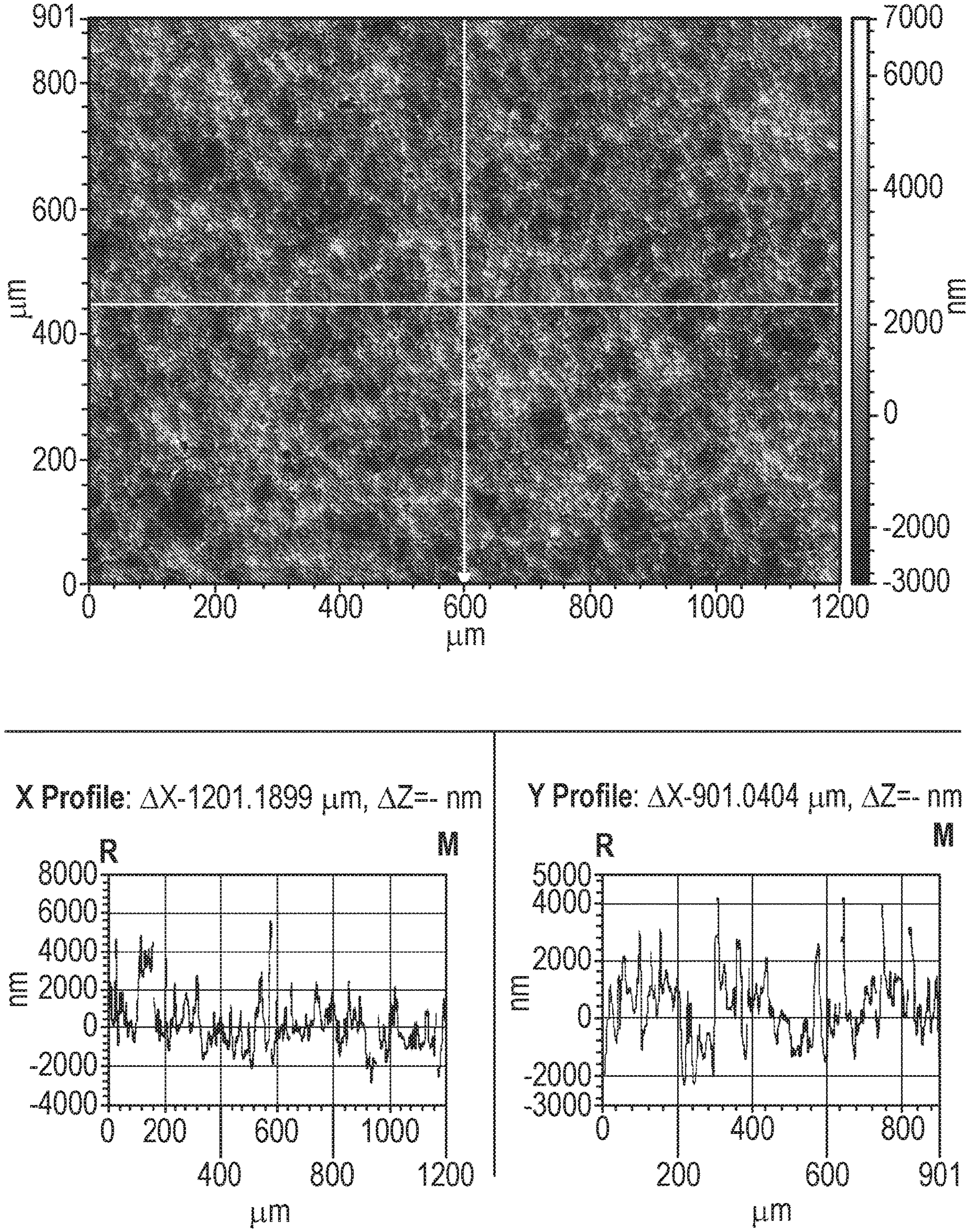
Figure 7B:
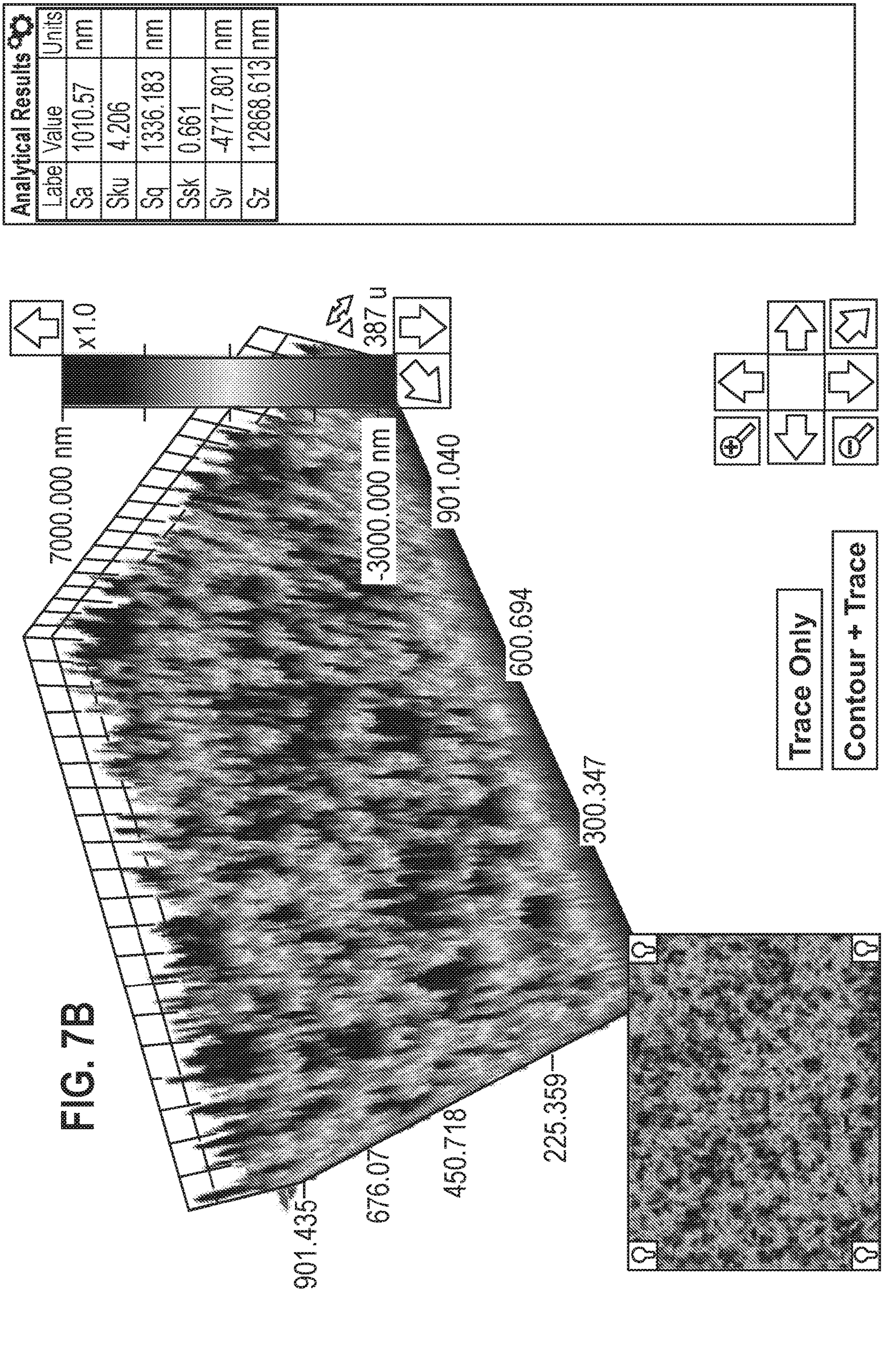
Figure 7C:
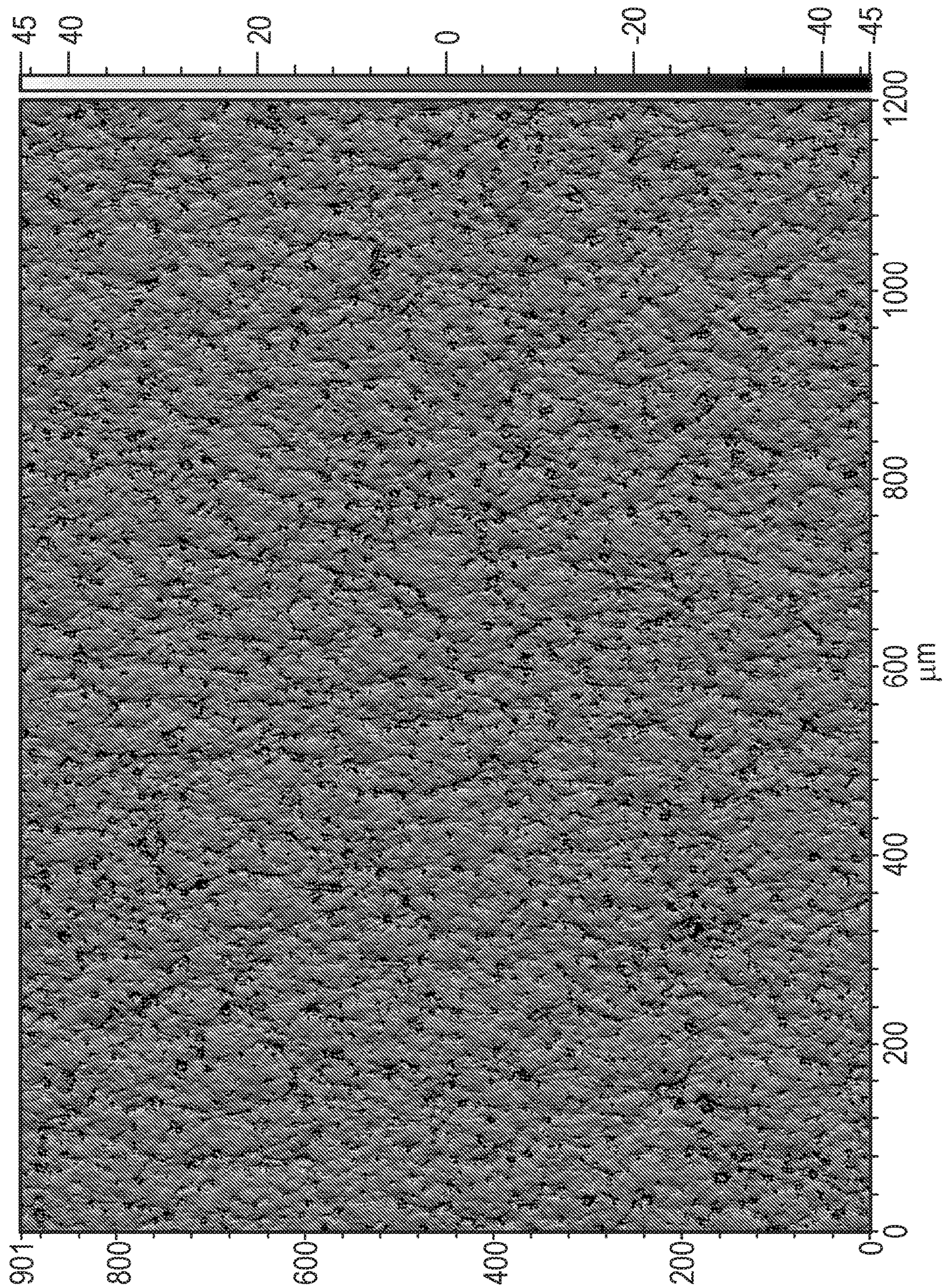

FIG. 7 includes images generated from the surface roughness analysis to represent the surface of the film of Example 2.

Figure 8A:
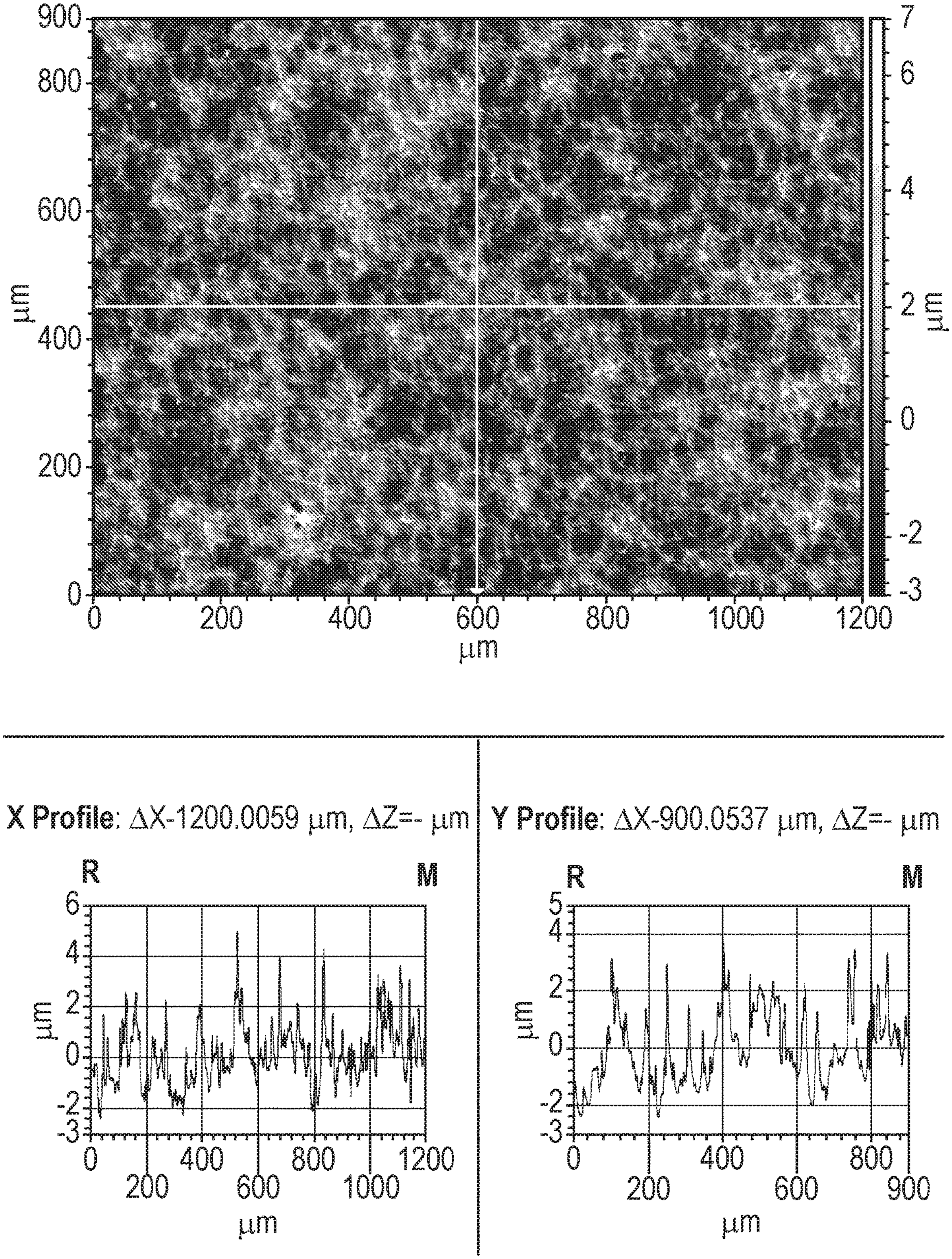
Figure 8B:
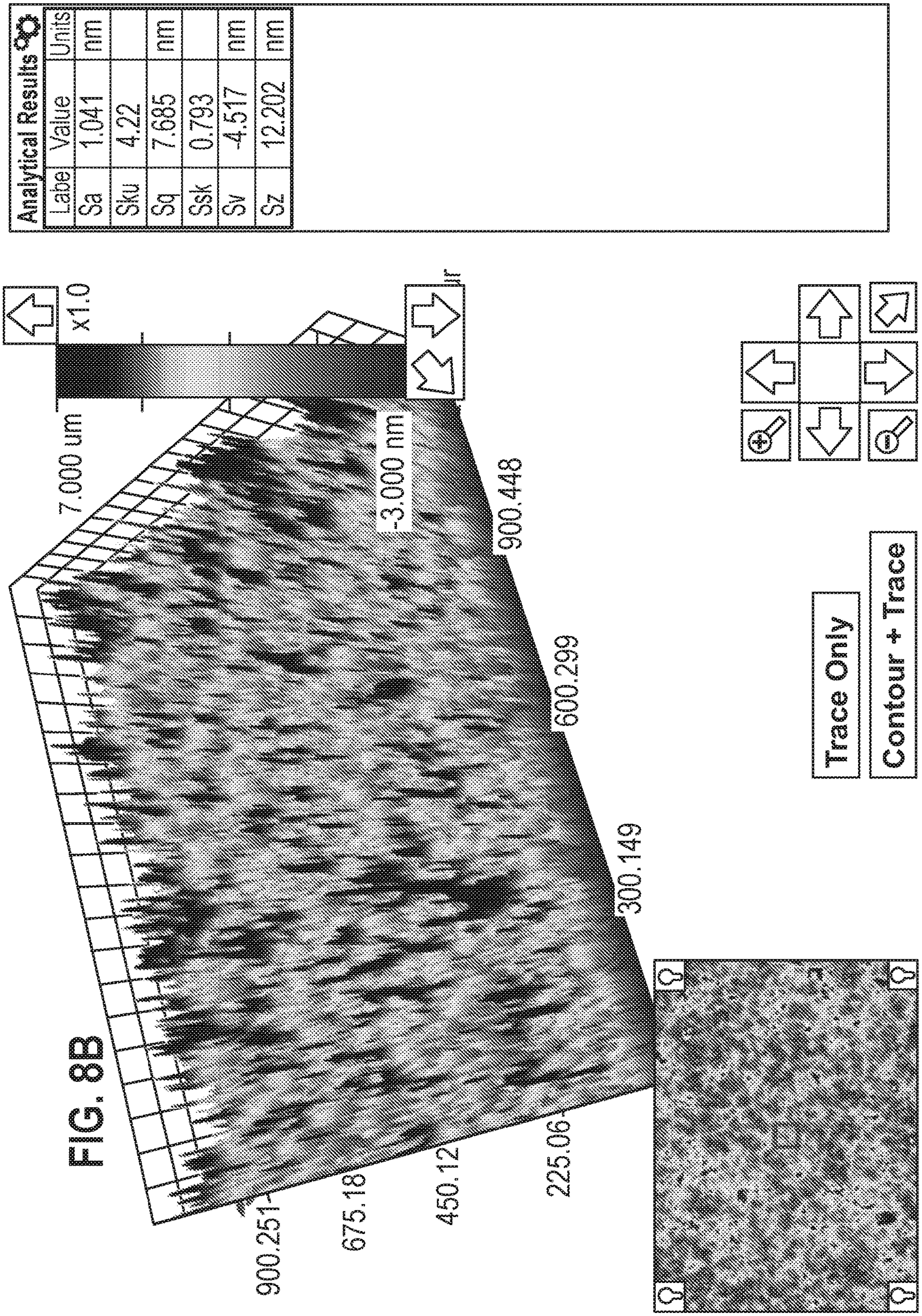
Figure 8C:
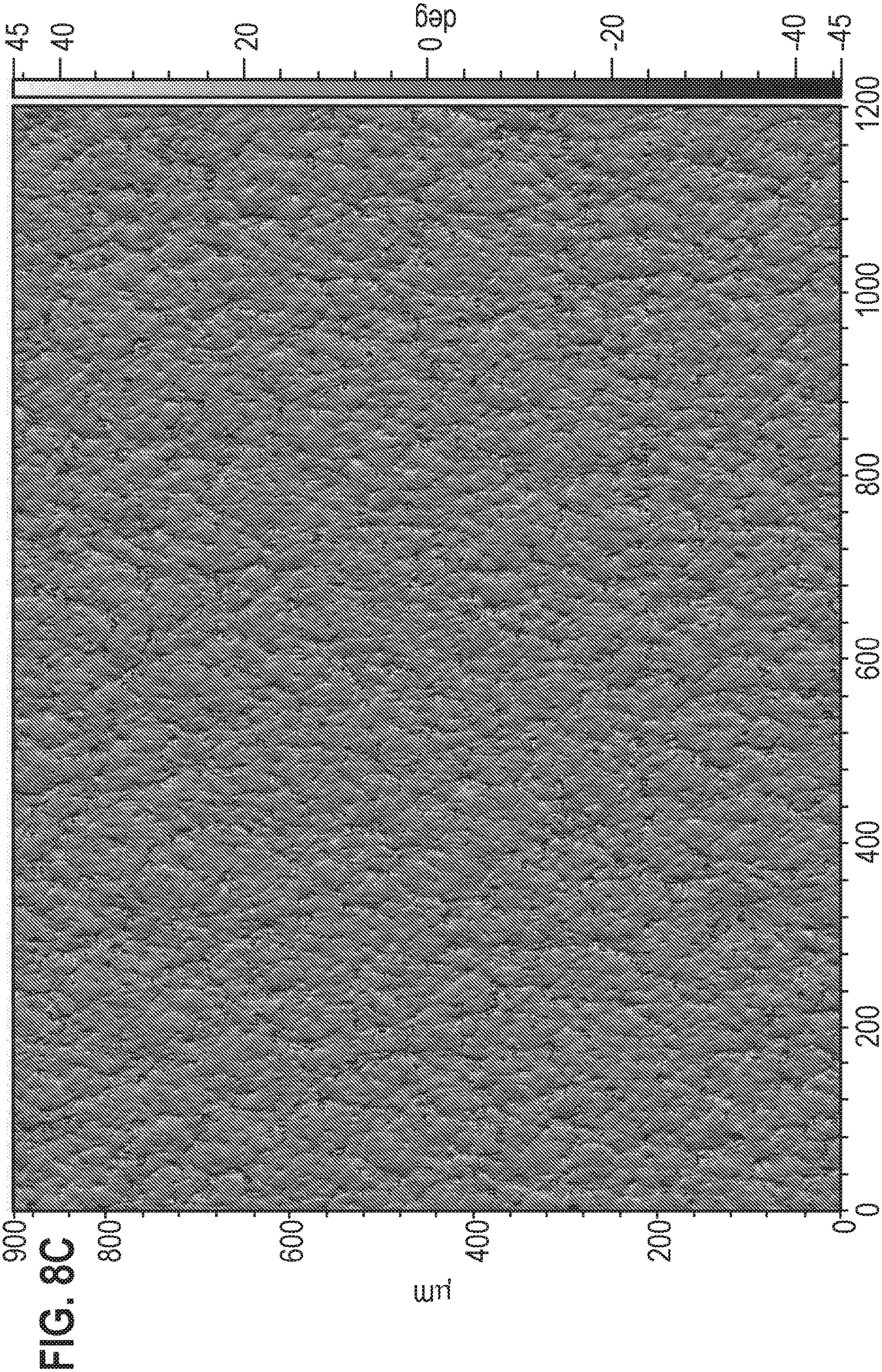

FIG. 8 includes images generated from the surface roughness analysis to represent the surface of the film of Example 3.

Figure 9A:
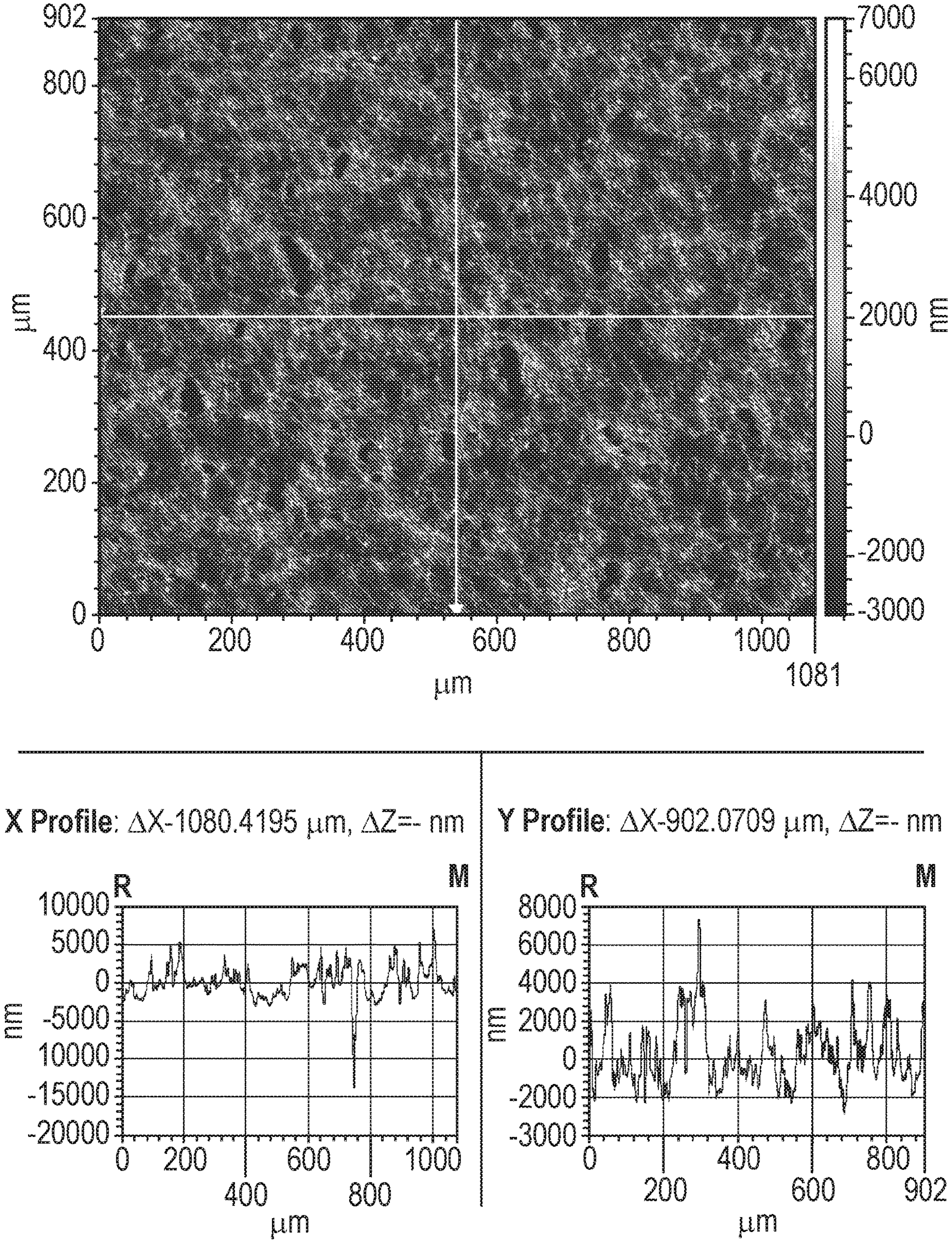
Figure 9B:
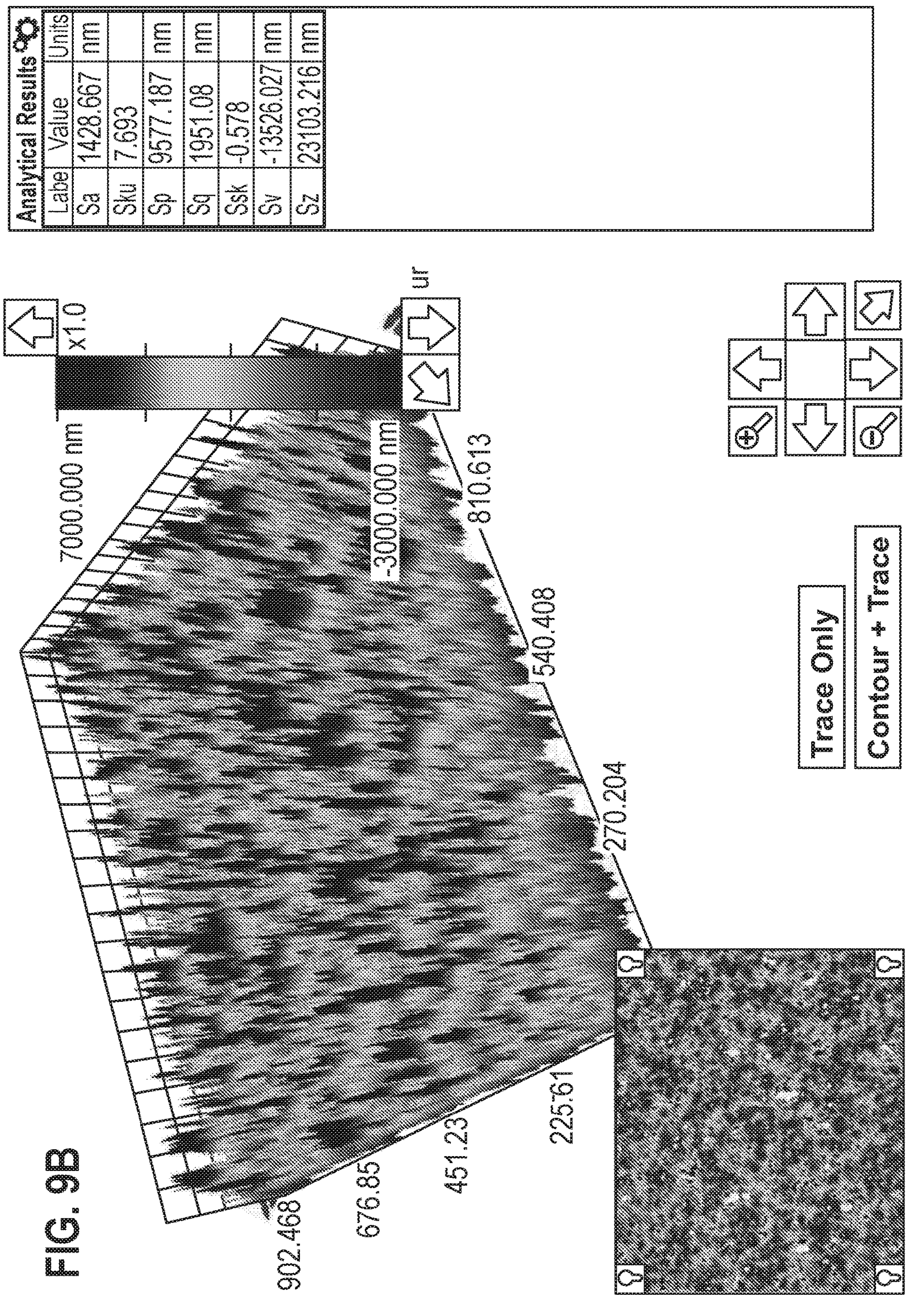
Figure 9C:
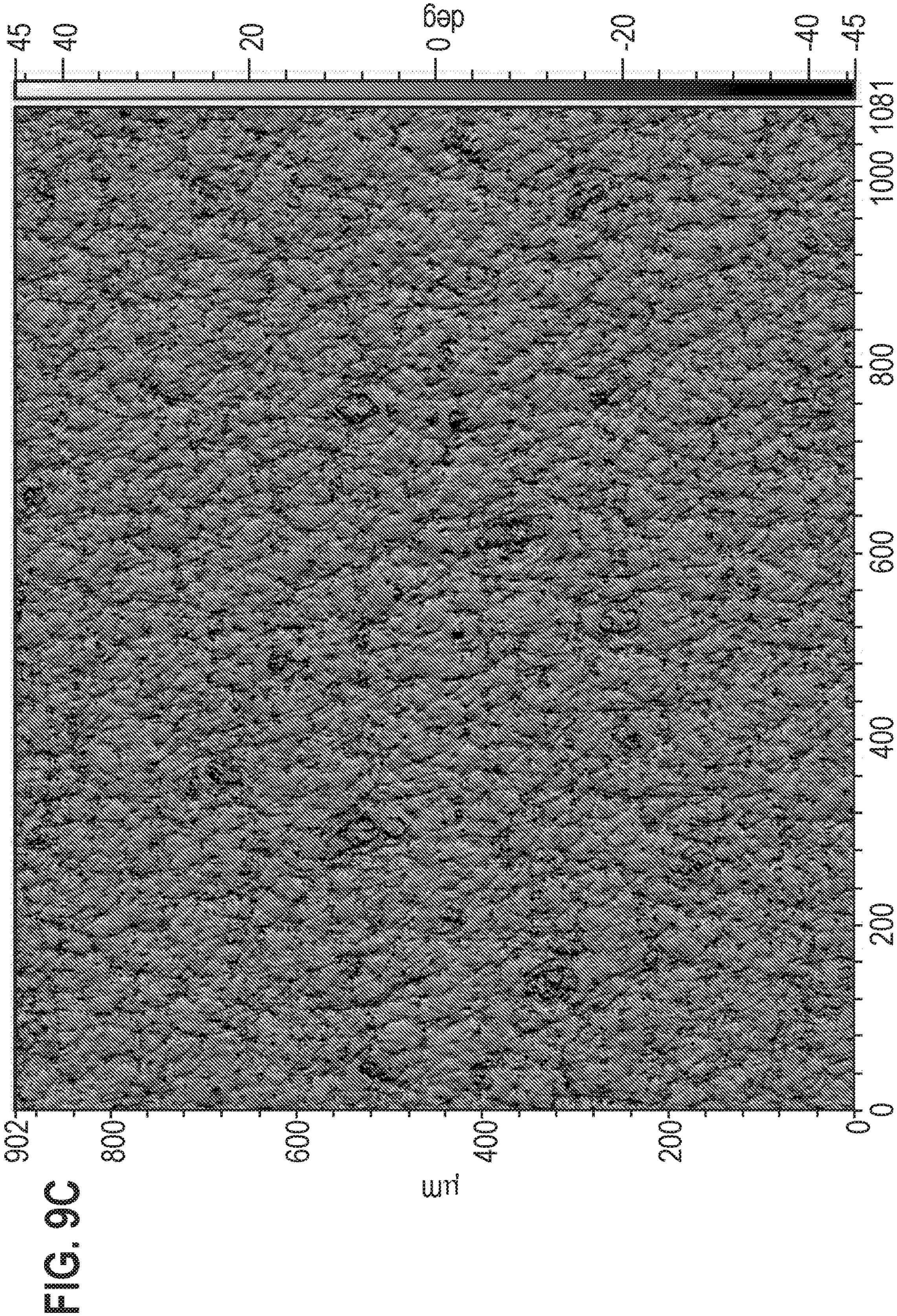

FIG. 9 includes images generated from the surface roughness analysis to represent the surface of the film of Example 4.

EXAMPLES

The present invention will now be described in detail with reference to the following non limiting examples provided to further illustrate the processes and compositions of the present invention. These examples are illustrative only and are not intended to limit the scope of the invention in any way. Unless otherwise specified all parts, percentages, and ratios are on a weight basis.

Various registered trademarks, other designations and/or abbreviations are used herein to denote some of ingredients used to prepare polymers and compositions of the invention. These are identified below by chemical name and/or trade name and optionally their manufacturer or supplier from whom they are available commercially. However where a chemical name and/or supplier of a material described herein is not given it may easily be found for example in reference literature well known to those skilled in the art: In the examples the following abbreviations may be used:

Sylysia® SY270 denotes the micronized synthetic amorphous silica-gel based anti-blocking and matting agent available commercially from Fuji Silysia under that trade designation.

Sylobloc® C807 (also referred to a Syloid® C807) denotes the amorphous synthetic silica matting agent available commercially from W R Grace under that trade designation.

Sylobloc® SP520 (also referred to a Syloid® SP520) denotes the silica zeolite blocking agent available commercially from W R Grace under that trade designation.

Sylobloc®25B denotes the amorphous silica available commercially from W R Grace under that trade designation.

Sylobloc®45 denotes the amorphous silica available commercially from W R Grace under that trade designation.

Example 1

A multi-layer PET coextruded film was prepared conventionally of layer structure AB. A surface side 'layer B' was a PET co-polyester with 6 mol % IPA, comprising silica filler (approx. 10% by weight of the layer of amorphous low porous silica Sylobloc® 25B in the surface layer). The other film side was layer A, which was an unfilled PET homopolymer. The coextruded film was prepared conventionally and after orientation in the MD and TD a film was obtained with a matt surface (of layer B) having 60° gloss values as shown in the table below and an 85° gloss value of 1 unit, which is on a par with plain paper.

Layer A (first unfilled layer) has a thickness of about 40 μm. Layer B, the second matt layer has a thickness within the range of 10 to 12 μm.

TABLE 1

| Ex | Filler amorphous silica | Filler amount (% wt) | Filler amount (% vol) | IPA (wt %) | IR Heaters | MD Gloss 60° | TD Gloss 60° |
|---|---|---|---|---|---|---|---|
| 1 | Sylobloc ® 25B | 10 | 14 | 6 | 0/65/8 | 5.6 | 5.5 |

The particle size properties of the amorphous silica filler (Sylobloc® 25B) were measured according to the method described in ISO 13320 and found to have the following properties:

volume-weighted mean size ($D_{(4,3)}$) of 3.008 μm, particle median size ($D_{50}$) of 2.982 μm, $D_{(3,0)}$ of 2.297 μm, $D_{10}$ of 1.915 μm and $D_{90}$ of 4.181 μm.

The silica had a porosity of 0.6 ml/g.

Figure 2:
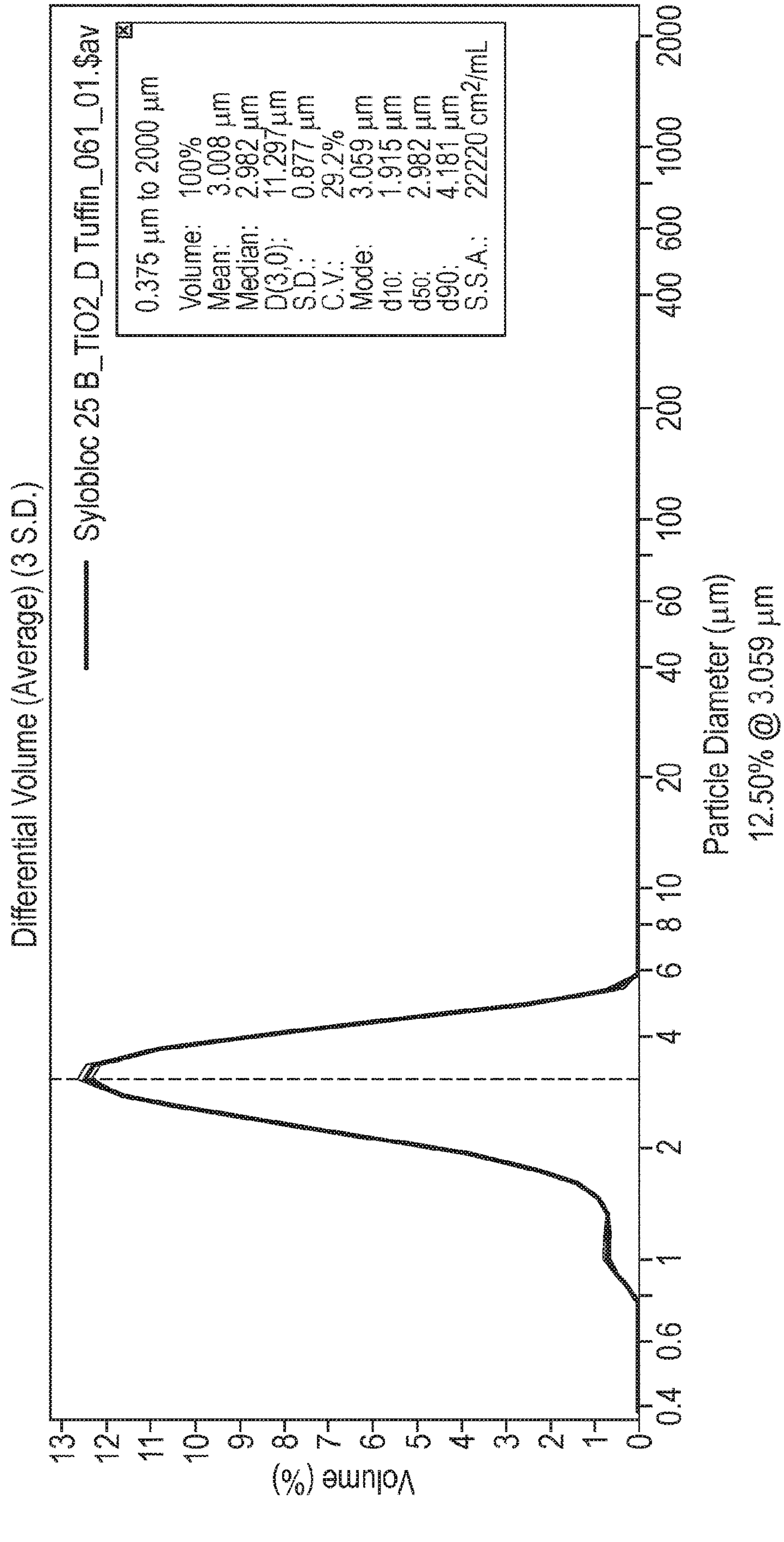
FIG. 2 is a plot of the particle size distribution of the particles used to prepare the film of Example 1.

As can be seen from FIG. 2 the PSD of Sylobloc® 25B was found to have a small shoulder (reflecting a multimodal PSD). The volume weighted mean was found to be a more meaningful measure of particle size distribution (PSD) when calculating number of particles in given mass volume of film especially where the PSD may be multimodal.

Surface properties of the film of Example 1 were measured using ISO 25178 method and determined to be: Sa=0.65 μm, Sq=0.85 μm, Sz=9 μm (using 0.4 μm optical resolution, 0.2 μm detector resolution and field of view 0.9×1.2 mm).

Figure 1:
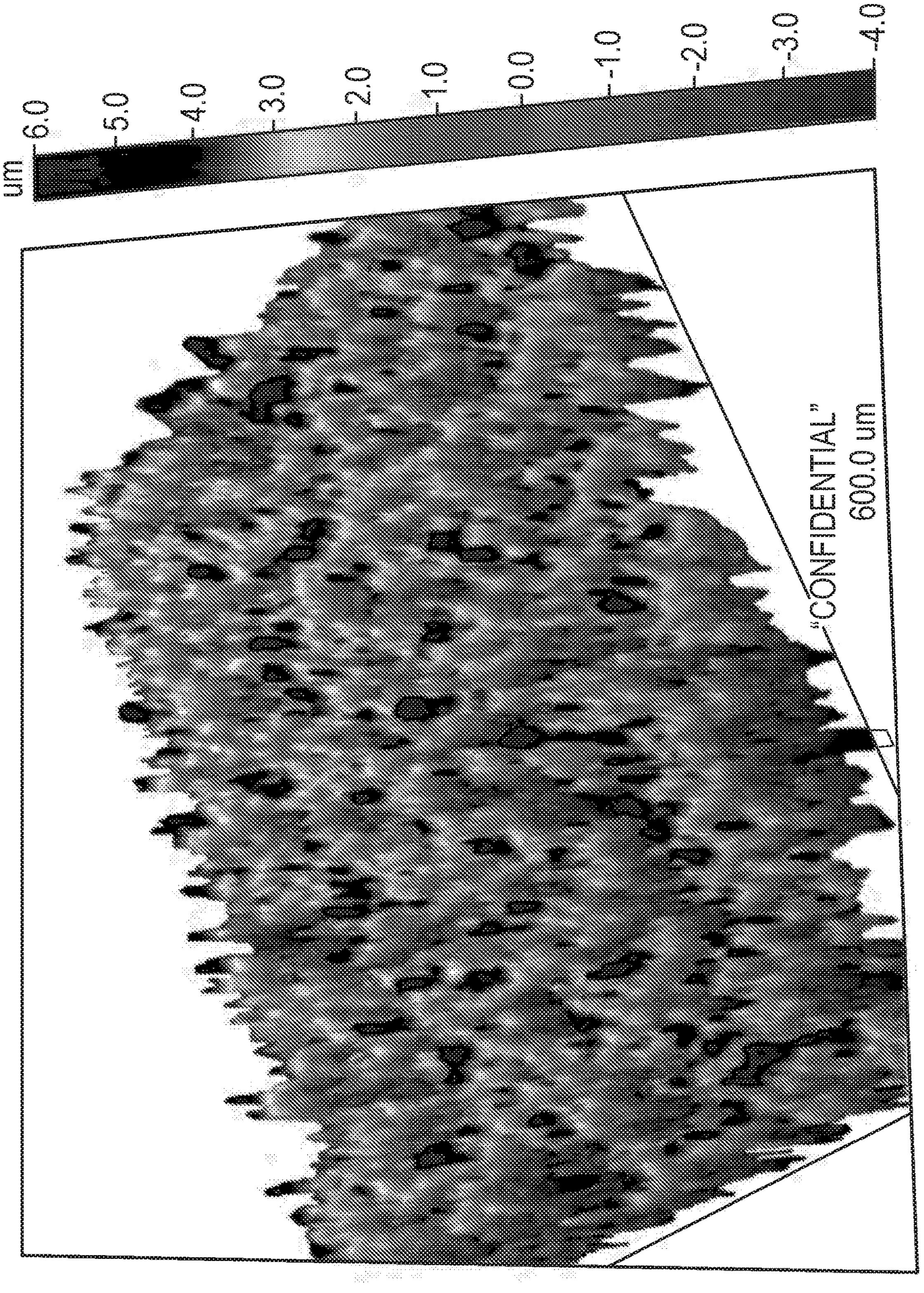
FIGS. 1, 3 and 4 are images generated from the surface roughness analysis to represent the surface of the film of Example 1.
Figure 3:
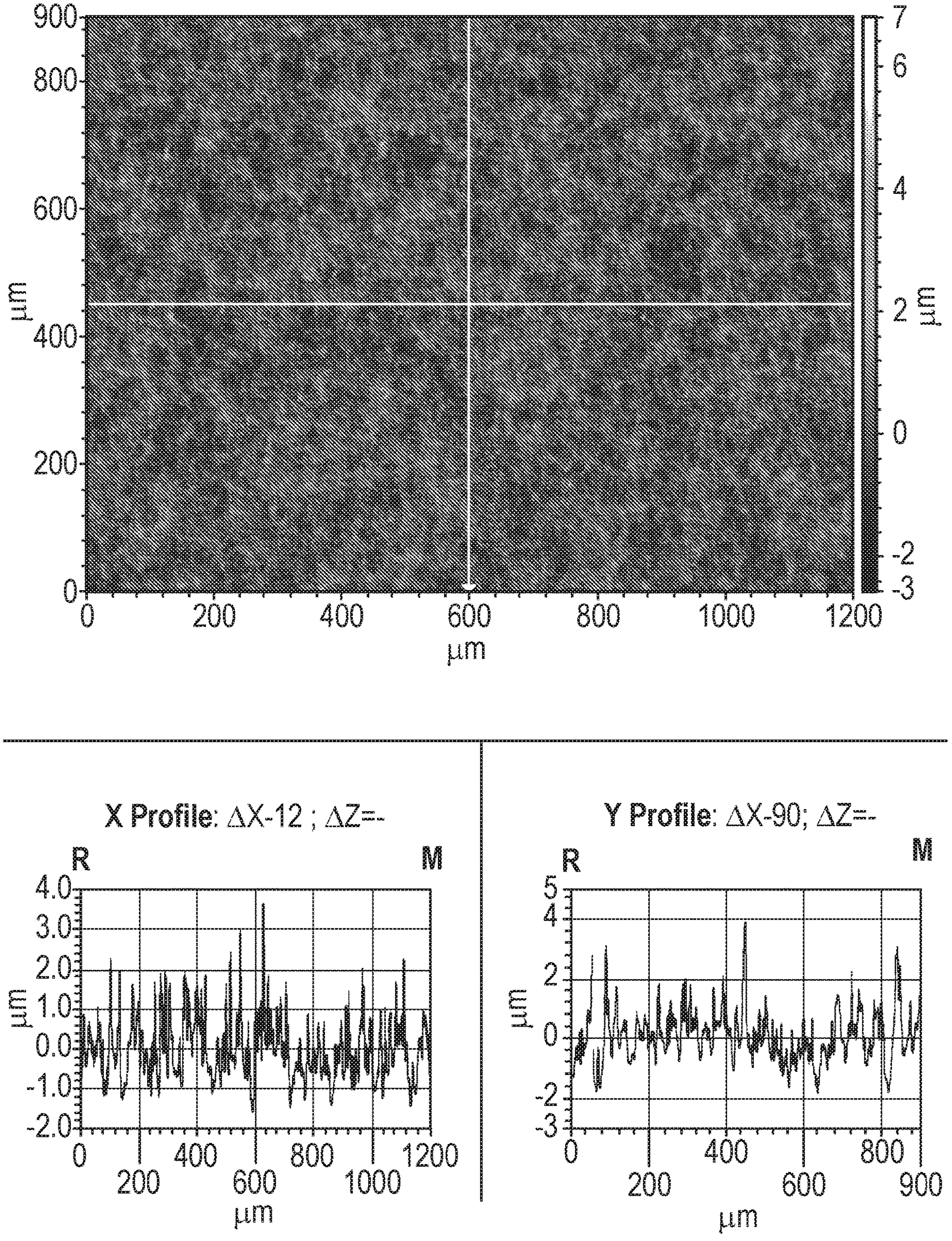
Figure 4:
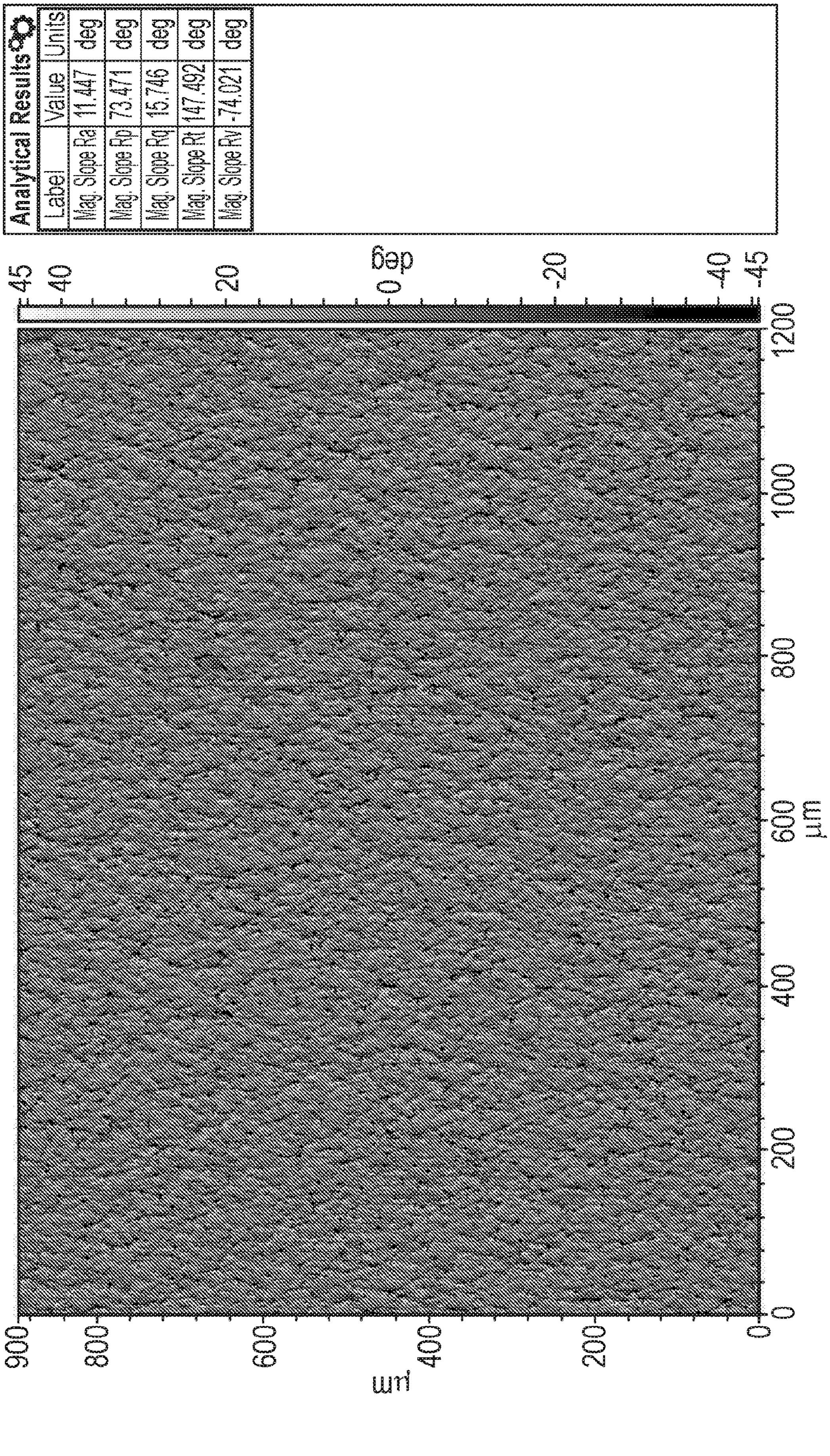

Surface roughness plots of the surface of the film of Example 1 are shown in FIGS. 1, 3 and 4.

Examples 2 to 4

Multi-layer PET coextruded films were prepared conventionally having a layer structure AB. The surface side 'layer B' was a PET co-polyester further comprising IPA, and layer B further comprised silica filler, as shown in Table 2. The other film side was layer A, which was an unfilled PET homopolymer. The coextruded film was prepared conventionally and after orientation in the MD and TD a film was obtained with a matt surface (of layer B) having the 60° gloss values as shown in the table below.

The total thickness of each multi-layer film was approximately 70 to 80 μm. The thickness of layer B in the films of Examples 2 and 4 was approximately 20 to 30 μm and the thickness of layer B in the film of Example 3 was 34 μm.

TABLE 2

| Ex. | Filler amorphous silica | Porosity of silica (ml/g) | Filler amount (% wt in layer B) | Filler amount (% vol.) | IPA (mol %) | MD Gloss 60° | TD Gloss 60° |
|---|---|---|---|---|---|---|---|
| 2 | Sylobloc ® 45 | 1 | 12.5 | 22 | 4.5 | 6.6 | 6.5 |

TABLE 2-continued

| Ex. | Filler amorphous silica | Porosity of silica (ml/g) | Filler amount (% wt in layer B) | Filler amount (% vol.) | IPA (mol %) | MD Gloss 60° | TD Gloss 60° |
|---|---|---|---|---|---|---|---|
| 3 | Sylobloc ® 45 | 1 | 12.5 | 22 | 11 | 6.0 | 5.8 |
| 4 | PolyOne | 1 | 15 | 26 | 4.5 | 4.2 | 4.2 |

The particle size properties of the amorphous silica filler (Sylobloc® 45) were measured according to the method described in ISO 13320 and found to have the following properties:

volume-weighted mean size ($D_{(4,3)}$) of 5.556 μm, particle median size ($D_{50}$) of 5.053 μm, $D_{(3,0)}$ of 4.882 μm, $D_{10}$ of 3.857 μm and $D_{90}$ of 8.575 μm.

PolyOne is a commercially available amorphous silica filler, which is believed to be identical to Sylobloc® 45.

Surface properties of the film of Examples 1 to 4 were measured using the ISO 25178 method as described above and the surface slope was measured using Bruker's Vision software "version 5.7 update 1". The results are shown in Table 3 below.

TABLE 3

| Example | Sa (μm) | Sq (μm) | Sz (μm) | Surface slope in the X direction (°) | Surface slope in the Y direction (°) |
|---|---|---|---|---|---|
| 1 | 0.6 | 0.8 | 9.0 | 11 | 16 |
| 2 | 1.0 | 1.4 | 13 | 10 | 15 |
| 3 | 1.0 | 1.4 | 12 | 11 | 16 |
| 4 | 1.4 | 2.0 | 23 | 16 | 22 |

Surface roughness plots of the surface of the film of Examples 2 to 4 are shown in FIGS. 7 to 9 respectively.

The Gurley porosity of the films of Examples 1 to 4 was measured as described herein and the results are shown in Table 4 below and FIG. 5. The stain length was also assessed, as shown in Table 4 and FIG. 6.

TABLE 4

| Example | Gurley Porosity (s) | Stain Length (mm) |
|---|---|---|
| 1 | About 360,000 | About 84 |
| 2 | About 400,000 | About 84 |
| 3 | About 340,000 | About 82 |
| 4 | About 75,000 | About 46 |

The Gurley Porosity of the films of Examples 1 to 3 are high (i.e. in the hundreds of thousands) demonstrating that these "ultra matt" films are very non-porous. Thus, these films are not tailored for printing because the high Gurley Porosity suggests that the ink would not be rapidly absorbed. In contrast, the film of Example 4 exhibits a lower Gurley Porosity, demonstrating that this "ultra matt" film exhibits sufficient porosity that the ink would be rapidly absorbed such that the film is readily printable.

These results are confirmed by the stain length. As shown in FIG. 6, the stain length of the film of Example 4 was much shorter than the stain length of the films of Examples 1 to 3. The films of Examples 1 to 3 are more "closed", causing the dye to remain on the surface and spread further. In other words, the dye has bled across the film. In contrast, the film of Example 4 can be considered more "open" because it readily accepts the liquid, indicating that it is more absorbent. Furthermore, the film of Example 4 exhibited ink with a sharp edge, i.e. the ink has not smudged or bled, which is desirable for printing.

However, as the films of Examples 1 to 3 are very non-porous, whilst still being ultra matt, these films are particularly tailored for use in cast release applications. In particular, due to the lower porosity and lower filler loading (particularly by decreasing the volume amount of filler) the films of Examples 1 to 3 exhibit improved resistance to delamination. Accordingly, the films are better suited to withstand the manufacturing processes required during cast release.

The Examples demonstrate how the properties of ultra-matt films can be tailored to improve their performance in a desired end-use. For instance, Example 4 demonstrates that by increasing the amount of filler (particularly by increasing the volume amount of filler), the surface area and the surface porosity of the film may be increased such that the surface exhibits suitable printability. In contrast, Examples 1 to 3 demonstrate that by lowering the volume amount of filler, and by using relatively non-porous silica filler, the surface porosity of the film may be decreased such that the film tends to exhibit improved delamination and improved mechanical resistance for end-uses such as a cast release film.

The invention claimed is:

1. A composite multi-layer coextruded matt film comprising:

a) a self-supporting first layer A of a film of a first polymer A1;

b) an optional primer layer on said first layer, between said first layer and the second layer;

c) a second layer B of a second polymer B1, being located on the optional primer layer where present, or directly on said first film layer A in the absence of said optional primer layer, the second layer forming a matt, outer surface of the multi-layer film;

wherein the second layer comprises particles having a volume-weighted mean size ($D_{(4,3)}$) of no more than 25 μm, wherein the particles are present in an amount of from about 5% to about 35% by volume fraction of the second layer B of the film, and wherein the matt, outer surface exhibits a 60° gloss of no more than 8 units and an 85° gloss of no more than 10 units;

wherein the second layer B has a surface texture characterised by a Sq value of at least 0.5 μm and of no more than 10 μm, wherein the Sq value is measured using the ISO 25178 method; and wherein the film has a Gurley porosity of from 25,000 to 250,000 seconds.

2. A composite multi-layer coextruded matt film for cast release applications, wherein the film comprises:

a) a self-supporting first layer A of a film of a first polymer A1 (optionally wherein the first polymer is a polyester), optionally wherein said film is oriented in at least one direction;

b) an optional primer layer on said first layer, between said first layer and the second layer;

c) a second layer B of a second polymer B1, being located on the optional primer layer where present, or directly on said first film layer A in the absence of said optional primer layer, (optionally wherein said second polymer is a polyester), the second layer forming a matt outer surface of the multi-layer film; where the second layer comprises particles, where the particles i) are present in the second layer B in an optional amount of from 3 to 30% by weight, the weight of said second layer being 100%;

ii) have a volume-weighted mean size ($D_{(4,3)}$) of no more than 25 μm; and iii) are present in the second layer in an amount of from about 5 to about 23% by volume fraction, the volume of said second layer of which the particles form a part being 100%; and wherein the matt outer surface exhibits a 60° gloss of no more than 8 units and an 85° gloss of no more than 10 units;

wherein the second layer B has a surface texture characterised by a Sq value of at least 0.5 μm and of no more than 10 μm, wherein the Sq value is measured using the ISO 25178 method; and wherein the film has a Gurley porosity of from 280,000 seconds to 500,000 seconds.

3. A film as claimed in claim 1, which is orientated in at least one direction.

4. A film as claimed in claim 1, wherein at least one surface of the film is a matt, printable surface which is uncoated.

5. A film as claimed in claim 1, in which said particles comprise an inorganic filler or pigment.

6. A film as claimed in claim 1, in which the particles are present in an amount of from 10 to 25% by volume fraction of layer B, the total layer volume of layer B of which the particles form a part being 100%.

7. A film as claimed in claim 1, in which the particles are present in the second layer B of the multi-layer film in the amount of 5 to 26% by weight, the layer weight of layer B of which the particles form a part being 100%.

8. A film as claimed in claim 1, in which the particles are present in the second layer B of the multi-layer film in the amount of 10 to 30% by weight, the layer weight of layer B of which the particles form a part being 100%.

9. A film as claimed in claim 1, in which the particles have a volume-weighted mean size ($D_{(4,3)}$) of no more than 10 μm.

10. A film as claimed in claim 1 which comprises a film forming polymer A1 in the first layer A and a film forming polymer B1 in the second layer B of the multi-layer film, the film forming polymers being selected from polyolefins, polar polymers, suitable combinations and/or mixtures thereof.

11. A film as claimed in claim 10 in which the film forming polymers are selected from: polypropylene (PP), polyethylene (PE), polyester, polyamide and/or polyaryletherketone.

12. A film as claimed in claim 11 in which the film forming polymers are selected from polypropylene (PP), polyethylene (PE), polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate (PHBV), polyethylene terephthalate (PET), polybutylene terephthalate (PBT), polytrimethylene terephthalate (PTT), polyethylene naphthalate (PEN), polyethylene furanoate (PEF) and/or polyether ether ketone (PEEK).

13. A film as claimed in claim 12 in which the film forming polymers are selected from polyethylene terephthalate (PET) and/or polyethylene naphthalate (PEN).

14. A film as claimed in claim 13 in which the film forming polymers are polyethylene terephthalate (PET).

15. A film as claimed in claim 1 wherein the polymer B1 of particle-containing layer B is a copolyester further comprising a comonomer in the dicarboxylic acid fraction.

16. A film according to claim 15 wherein said comonomer is present in the copolyester in an amount of from about 3 to about 20 mol %.

17. A film as claimed in claim 1, where the film or layer surface having particles therein has a surface texture characterised by a Sa value of from 0.01 μm to 10 μm, wherein the Sa value is measured using the ISO 25178 method.

18. A film as claimed in claim 1, where the film or layer surface having particles therein has a surface texture characterised by a Sz value of from 1 μm to 30 μm, wherein the Sz value is measured using the ISO 25178 method.

19. A film as claimed in claim 1, wherein the film has a Gurley porosity of from 25,000 to 200,000 seconds.

20. A film as claimed in claim 2, wherein the film has a Gurley porosity of from 300,000 seconds to 500,000 seconds.

21. A process for manufacturing a polymeric film as claimed in claim 1, the process comprising the steps of:

(i) selecting a particulate material having a volume-weighted mean size ($D_{(4,3)}$) of no more than 25 μm;

(ii) adding the particles selected from step (i) to a film forming polymer, optionally to form a master batch composition of said polymer with the particles;

(iii) in an optional blending step, mixing said master batch composition from step (ii) with the same film forming polymer to form a homogenous mixture;

(iv) extruding the polymer mixture from step (ii) or (iii) through a die to form a polymer film with the selected particles dispersed therein;

(v) subsequently to step (iv), heating and stretching the film to orient the film in at least one direction;

where the film is characterised by having particles:

a) present in the film in an optional amount of from 3 to 30% by weight, the weight of the film being 100%; and b) having a volume-weighted mean size ($D_{(4,3)}$); and wherein the film surface exhibits a 60° gloss of no more than 8 units and an 85° gloss of no more than 10 units.

22. A printed film, wherein the film is the multi-layer film as defined in claim 1, which exhibits at least one matt, printable surface, wherein said printed film comprises an ink layer disposed directly on said matt printable surface, and wherein the ink is directly disposed on said second layer B.

23. A method of printing on a substrate comprising the steps of:

(i) providing the multi-layer film as defined in claim 1, which exhibits at least one matt printable uncoated surface, and (ii) disposing an ink layer directly on to said matt printable uncoated surface.

24. A process for manufacturing a multi-layer polymeric film as claimed in claim 1, the process comprising the steps of:

(i) selecting a particulate material having a volume-weighted mean size ($D_{(4,3)}$) of no more than 25 μm;

(ii) adding the particles selected from step (i) to a film forming polymer B1, optionally to form a master batch composition of said polymer B1 with the particles;

(iii) in an optional blending step, mixing said master batch composition from step (ii) with the same film forming polymer B1 to form a homogenous mixture;

(iv) co-extruding the polymer mixture from step (ii) or (iii) through a die together with a film forming polymer A1 to form a multi-layer polymer film having a first layer A of a first polymer A1 and a second surface layer B which comprises the selected particles dispersed within polymer B1;

(v) subsequently to step (iv), heating and stretching the multi-layer film to orient the film in at least one direction;

where the film is characterised by having particles present in the surface layer B:

a) in an optional amount of from 3 to 30% by weight, the weight of the surface layer B being 100%; and b) having a volume-weighted mean size ($D_{(4,3)}$ of no more than 25 μm; and wherein the surface layer B exhibits a 60° gloss of no more than 8 units and an 85° gloss of no more than 10 units.

25. A method of cast release comprising the steps of:

(i) providing a multi-layer film as defined in claim 2, which exhibits at least one matt surface, (ii) disposing a substrate against said matt surface, (iii) pressing the substrate and film together under increased temperature and pressure such that the texture of the matt surface is transferred onto the substrate, and (iv) removing the film in order to obtain a textured substrate.

26. A film as claimed in claim 1 in which the second layer B has a surface texture characterised by a Sq value of at least 0.7 μm and of no more than 10 μm, wherein the Sq value is measured using the ISO 25178 method.

27. A film as claimed in claim 2 in which the second layer B has a surface texture characterised by a Sq value of at least 0.7 μm and of no more than 10 μm, wherein the Sq value is measured using the ISO 25178 method.

* * * * *